(12) United States Patent
Ode et al.

(10) Patent No.: US 9,444,542 B2
(45) Date of Patent: Sep. 13, 2016

(54) RADIO COMMUNICATION SYSTEM

(75) Inventors: Takayoshi Ode, Kawasaki (JP); Kazuhisa Obuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 822 days.

(21) Appl. No.: 13/179,921

(22) Filed: Jul. 11, 2011

(65) Prior Publication Data

US 2011/0261751 A1    Oct. 27, 2011

Related U.S. Application Data

(63) Continuation of application No. PCT/JP2009/050775, filed on Jan. 20, 2009.

(51) Int. Cl.
| | |
|---|---|
| H04W 4/00 | (2009.01) |
| H04B 7/155 | (2006.01) |
| H04W 72/00 | (2009.01) |
| H04B 7/04 | (2006.01) |
| H04B 7/26 | (2006.01) |
| H04L 12/18 | (2006.01) |
| H04L 27/34 | (2006.01) |
| H04W 88/06 | (2009.01) |
| H04W 84/12 | (2009.01) |

(52) U.S. Cl.
CPC ........ *H04B 7/15507* (2013.01); *H04B 7/0413* (2013.01); *H04B 7/15514* (2013.01); *H04B 7/15542* (2013.01); *H04B 7/15557* (2013.01); *H04B 7/2606* (2013.01); *H04L 12/189* (2013.01); *H04L 12/1863* (2013.01); *H04L 27/34* (2013.01); *H04W 72/005* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | |
|---|---|---|
| 6,775,296 B1 | 8/2004 | Kitamura |
| 6,801,512 B1 | 10/2004 | Cudak et al. |
| 2003/0185282 A1* | 10/2003 | Hudson ............... H04J 13/0048 375/146 |
| 2004/0057499 A1 | 3/2004 | Haartsen |
| 2004/0264550 A1 | 12/2004 | Dabak |

(Continued)

FOREIGN PATENT DOCUMENTS

| | | |
|---|---|---|
| AU | 2009333790 A1 | 7/2011 |
| EP | 0 748 064 A2 | 12/1996 |

(Continued)

OTHER PUBLICATIONS

Notice of Preliminary Rejection issued for corresponding Korean Patent Application No. 10-2013-7001462, mailed Apr. 3, 2013 with English translation.

(Continued)

*Primary Examiner* — Chi H Pham
*Assistant Examiner* — Soon-Dong D Hyun
(74) *Attorney, Agent, or Firm* — Myers Wolin, LLC

(57) ABSTRACT

In a radio communication system a first radio station performs communication by the use of a first radio signal. A second radio station receives a second radio signal which is indistinguishable from the first radio signal. A third radio station is in a radio communication area of the first radio station and a radio communication area of the second radio station. A communication format conversion unit generates a third radio signal by converting a communication format of the second radio signal to a communication format which is distinguishable from the first radio signal, and communicates with the third radio station by the use of the third radio signal.

15 Claims, 25 Drawing Sheets

(56) References Cited

U.S. PATENT DOCUMENTS

| | | | |
|---|---|---|---|
| 2006/0067531 A1 | 3/2006 | Yamazaki | |
| 2006/0176966 A1 | 8/2006 | Stewart et al. | |
| 2006/0251115 A1 | 11/2006 | Haque et al. | |
| 2006/0291577 A1* | 12/2006 | Boariu | H04L 5/0007 375/260 |
| 2007/0105554 A1* | 5/2007 | Clark et al. | 455/435.1 |
| 2007/0297412 A1 | 12/2007 | Feng | |
| 2009/0059882 A1 | 3/2009 | Hwang et al. | |
| 2009/0116423 A1 | 5/2009 | Ni et al. | |
| 2009/0143008 A1 | 6/2009 | Hottinen et al. | |
| 2009/0303895 A1* | 12/2009 | Zhang et al. | 370/252 |
| 2009/0303918 A1* | 12/2009 | Ma et al. | 370/315 |
| 2010/0014505 A1 | 1/2010 | Wang et al. | |
| 2010/0034139 A1* | 2/2010 | Love et al. | 370/328 |
| 2010/0085913 A1* | 4/2010 | Subrahmanya | 370/328 |
| 2010/0150177 A1* | 6/2010 | Cai et al. | 370/476 |
| 2010/0159935 A1* | 6/2010 | Cai et al. | 455/450 |
| 2010/0317284 A1* | 12/2010 | Charbit et al. | 455/7 |
| 2011/0194523 A1 | 8/2011 | Chung et al. | |

FOREIGN PATENT DOCUMENTS

| | | |
|---|---|---|
| EP | 1 804 494 | 7/2007 |
| EP | 1 850 560 A1 | 10/2007 |
| EP | 2 381 705 A1 | 10/2011 |
| JP | 05-048611 | 2/1993 |
| JP | 09-116480 | 5/1997 |
| JP | 10-032557 | 2/1998 |
| JP | 2000-124874 | 4/2000 |
| JP | 2001-028561 | 1/2001 |
| JP | 2003-528513 | 9/2003 |
| JP | 2008-503130 | 1/2008 |
| JP | 09-116480 | 5/2009 |
| KR | 10-2007-0101307 | 10/2007 |
| WO | 01/71521 | 9/2001 |
| WO | 2006/121381 A1 | 11/2006 |
| WO | 2007/124670 A1 | 11/2007 |

OTHER PUBLICATIONS

Notice of Preliminary Rejection issued for corresponding Korean Patent Application No. 10-2013-7001463, mailed Apr. 3, 2013 with English translation.
Shin et al., "Summary of Multi-Hop Relay Technology", May 2008, pp. 30-37, vol. 25, No. 5, The Korean Institute of Communications and Information Sciences, with partial English translation.
International Search Report issued for corresponding International Patent Application No. PCT/JP2009/050775, mailed Apr. 21, 2009.
Office Action issued for corresponding Japanese Patent Application No. 2010-547335, issued Oct. 9, 2012, with partial English translation.
Office Action issued for corresponding Chinese Patent Application No. 200980154671.0, issued on Jul. 1, 2013, with full English translation.
3GPP TS 36.211 V8.3.0; 3rd Generation Partnership Project; Technical Specification Group Radio Access Network; "Evolved Universal Terrestrial Radio Access (E-UTRA); Physical Channels and Modulation" (Release 8); dated May 2008.
3GPP TS 36.300 V8.5.0; "3rd Generation Partnership Project; Technical Specification Group Radio Access Network;" Evolved Universal Terrestrial Radio Access (E-UTRA) and Evolved Universal Terrestrial Radio Access Network (E-UTRAN); Overall description; Stage 2 (Release 8); May 2008.
Alcatel Shanghai Bell, Alcatel-Lucent; 3GPP TSG-RAN WG RAN1#54; "Discussion on Technologies for Further Enhanced MBMS" R1-082815; pp. 1-11; Aug. 18-22, 2008. [Ref: ISR mailed Apr. 21, 2009].
Notice of Preliminary Rejection issued for corresponding Korean Patent Application No. 10-2011-7016624, mailed Oct. 18, 2012, with English translation.
Official Action issued for corresponding Russian Patent Application No. 2011134385, mailed Nov. 9, 2012 with an English translation.
NTT DoCoMo, Inc. et al.; "Clarification on the operation for normal and extended CP"; Agenda Item: 6.1; 3GPP TSG RAN WG1 Meeting #54bis; R1-083917; Prague, Czech Republic; Sep. 29-Oct. 3, 2008.
Panasonic; "Discussion on the various types of Relays"; Agenda Item: 12 Study Item on LTE-Advanced; 3GPP TSG RAN WG1 Meeting #54; R1-082397; Warsaw, Poland; Jun. 30-Jul. 4, 2008.
Patent Examination Report No. 3 issued for corresponding Australian Application No. 2009338410 dated Oct. 30, 2014.
Office Action issued for corresponding Russian Patent Application No. 2013123718 dated Dec. 25, 2014 with an English translation.
Sawahashi, Musashi Institute of Technology / NTT DoCoMo, Inc., "Radio Access Techniques for LTE-Advanced", Aug. 20, 2008.
Non-Final Office Action issued by the United States Patent and Trademark Office for corresponding U.S. Appl. No. 14/660,249 electronically delivered on May 21, 2015.
Non-Final Office Action issued by the United States Patent and Trademark Office for corresponding U.S. Appl. No. 14/660,258 electronically delivered on May 21, 2015.
Office Action issued for corresponding Canadian Patent Application No. 2,749,920 dated Apr. 10, 2015.
Patent Examination Report No. 1 issued for corresponding Australian Patent Application No. 2015201149 issued on Oct. 27, 2015.
Final Office Action issued by the United States Patent and Trademark Office for corresponding U.S. Appl. No. 14/660,249 electronically delivered on Nov. 24, 2015.
Final Office Action issued by the United States Patent and Trademark Office for corresponding U.S. Appl. No. 14/660,258 electronically delivered on Nov. 25, 2015.
Non-Final Office Action issued by the United States Patent and Trademark Office for corresponding U.S. Appl. No. 14/663,018 electronically delivered on Nov. 27, 2015.
Office Action issued for corresponding Canadian Application No. 2,749,920 mailed on Apr. 25, 2016.
Non-Final Office Action issued by the United States Patent and Trademark Office for corresponding U.S. Appl. No. 14/660,249 electronically delivered on Mar. 30, 2016.
Non-Final Office Action issued by the United States Patent and Trademark Office for corresponding U.S. Appl. No. 14/660,258 electronically delivered on Mar. 30, 2016.
Nokia et al., "Issues regarding MBSFN subframes", Agenda Item: 6.21, 3GPP TSG-RAN WG1 Meeting #51, R1-074863, Jeju, Korea, Nov. 5-9, 2007.
Extended European search report with supplementary European search report and the European search opinion issued by the European Patent Office for corresponding European Patent Application No. 09838766.5, mailed on Jun. 14, 2016.
Final Office Action issued by the United States Patent and Trademark Office for corresponding U.S. Appl. No. 14/663,018, electronically delivered on Jun. 3, 2016.

* cited by examiner

RADIO COMMUNICATION SYSTEM

This is a continuation of International Application No. PCT/JP2009/050775, filed Jan. 20, 2009, now pending, the contents of which are herein wholly incorporated by reference.

FIELD

The embodiments discussed herein are related to radio communication systems including a mobile telecommunication system, a radio LAN (Local Area Network) and the like.

BACKGROUND

In recent years a new high-speed communication service referred to as LTE (Long Term Evolution) has been expected as a standard for communication by a mobile station such as a portable telephone. In addition, a LTE-advanced system which is a further developed version of LTE is discussed in 3GPP (3rd Generation Partnership Project).

Furthermore, the LTE-advanced system is to be proposed as an IMT-advanced system which is a further developed version of an IMT (International Mobile Telecommunication)-2000 system which ITU-R (International Telecommunication Union Radio communications sector) determines to discuss.

W-CDMA (Wideband-Code Division Multiple Access), CDMA one, and WiMax (Worldwide Interoperability for Microwave Access) are typical IMT-2000 systems.

With a LTE-advanced system introducing a MBSFN (Multimedia Broadcast multicast service Single Frequency Network) in which MBMS (Multimedia Broadcast Multicast Service) data is transmitted and a relay apparatus (relay node) for performing radio relay with a LTE system as a base is discussed (expansion of uplink/downlink bandwidth, introduction of uplink MIMO (Multiple Input Multiple Output), and the like are also discussed). Description will now be given with a LTE-advanced system as an example.

(1) MBMS and MBSFN

A MBMS is a service for broadcasting data to unspecified or specific users. To be concrete, broadcasting information such as news or multicasting information to specific users is possible.

Furthermore, A MBSFN in which a plurality of base stations transmit MBMS data in synchronization with one another by the use of the same resource is discussed as a method for transmitting broadcast data (MBMS data) by the use of a MBMS.

"SFN" (Single Frequency Network) of "MBSFN" means using the same radio frequency. That is to say, usually a transmission area (MBSFN are) is set in a MBSFN and the same radio frequency is used in that area (see TS36.300V8.6.0 15 MBMS).

Moreover, with a MBSFN a plurality of base stations transmit the same data at the same frequency at the same timing. As a result, a mobile station can receive MBMS data transmitted from the plurality of base stations.

The reason for this is as follows. If delay time is shorter than or equal to the length of a CP (Cyclic Prefix) in, for example, OFDM (Orthogonal Frequency Division Multiplexing) receiving, then plural pieces of data can be received and synthesized. By receiving and synthesizing plural pieces of data, the effect of the improvement of a receiving characteristic can be obtained.

A CP is a redundant portion added at data transmission time to prevent a data overlap, and corresponds to a GI (Guard Interval) in terrestrial digital broadcasting. The length of a CP used in a MBSFN is longer than that of a CP added to unicast data in normal communication.

FIG. 20 illustrates the format of radio data. Radio data includes a CP and data. A CP used at unicast transmission time is referred to as a normal CP and a CP used in a MBSFN is referred to as an extended CP. The length of a normal CP is 4.69 μsec and the length of a CP used in a MBSFN (length of a CP included in MBMS data) is 16.67 μsec.

FIG. 21 illustrates data receiving and combining. It is assumed that a mobile station 120 receives MBMS data (data b) transmitted from a base station B and that the mobile station 120 receives MBMS data (data a) transmitted from a base station A time t after receiving the data b (data a and b are broadcast data and are equal in service contents).

If the delay time t falls within the range of the length of a CP from the time when the mobile station 120 begins to receive the data b, then the mobile station 120 can receive not only the data b but also the data a and combine the data a and b. As described above, a CP is long in a MBSFN. Therefore, a mobile station can also receive MBMS data transmitted from a remote base station (corresponding to the base station A in this example) and can perform combining.

(2) Relay Apparatus (Relay Node)

With a LTE-advanced system a relay node is installed between a base station and a mobile station, for example, for cell extension or as countermeasures for dead spots.

FIG. 22 illustrates cell extension. A mobile station 120 is outside a cell 100a of a base station 100. A relay node 110 is installed within the cell 100a. The mobile station 120 is within a relay area 110a in which the relay node 110 can perform relay.

If a relay node such as the relay node 110 does not exist, the mobile station 120 is outside the cell 100a and cannot communicate with the base station 100. However, if the relay node 110 is installed, the mobile station 120 is within the relay area 110a of the relay node 110. Even if the mobile station 120 is outside the cell 100a, radio relay is performed via the relay node 110 and communication can be performed between the base station 100 and the mobile station 120.

FIG. 23 illustrates countermeasures for a dead spot. A relay node 110 is installed within a cell 100a of a base station 100. There is a dead spot 110b within the cell 100a. A mobile station 120 is in the dead spot 110b. It is assumed that a relay area 110a of the relay node 110 covers the dead spot 110b.

If a relay node such as the relay node 110 does not exist and the mobile station 120 is in the dead spot 110b, it is difficult for the mobile station 120 to communicate with the base station 100. However, if the relay node 110 is installed and the relay area 110a of the relay node 110 covers the dead spot 110b, then radio relay is performed via the relay node 110 and communication can be performed between the base station 100 and the mobile station 120 in the dead spot 110b.

The following technique is proposed in Japanese Laid-open Patent Publication No. 2008-503130 (Paragraphs [0015]-[0020], FIG. 1) as a conventional technique regarding a MBMS. A mobile station estimates cell quality on the basis of the difference in transmission power between a common pilot channel and a common control channel and receives data from an adjacent cell in which cell quality is the highest.

In addition, the following technique is proposed in Japanese Laid-open Patent Publication No. 10-032557 (Paragraphs [0019]-[0021], FIG. 1) as a conventional radio relay technique. A transmission apparatus hierarchizes and transmits a relay apparatus signal which a relay apparatus retransmits and a receiving apparatus signal transmitted directly to a receiving apparatus. The relay apparatus demodulates the relay apparatus signal, modulates it again, and retransmits it.

With a MBMS radio network, as described above, a relay node can be installed for performing cell extension or taking countermeasures for a dead spot. In addition, with a MBSFN a radio signal is transmitted by the use of an extended CP which is longer than a normal CP used for normal unicast transmission. Accordingly, a radio signal transmitted from a base station distant from a mobile station can be received via a relay node. As a result, the possibility of receiving and combining more pieces of data can be enhanced.

With a conventional MBMS radio network, however, the problem of being unable to distinguish between unicast data and MBMS data transmitted in a MBSFN exists.

FIG. 24 illustrates the problem of being unable to distinguish between unicast data and MBMS data. There are base stations 101 through 103, mobile stations 121 through 123, and a relay node 110. The base station 101 transmits unicast data r1 to the mobile station 121. The base station 103 transmits unicast data r3 to the mobile station 123. In addition, the base station 102 transmits MBMS data r2 to the relay node 110 and the relay node 110 relay-transmits the MBMS data r2 to the mobile station 122.

With unicast data transmission the base station scrambles unicast data so that the unicast data can be distinguished from another piece of unicast data transmitted by the use of the same radio resource. That is to say, by using scrambling codes which differ in initial value, the unicast data can be distinguished from another piece of unicast data transmitted by the use of the same radio resource. Accordingly, the unicast data r1 and r3 indicated in FIG. 24 can be distinguished. In addition, with MBSFN transmission plural pieces of MBMS data are transmitted so that they can be distinguished. Therefore, pieces of MBMS data can be distinguished. That is to say, if the same communication format is used, pieces of data can be distinguished.

However, unicast data and MBMS data differ in communication format. In addition, there is no express provision that unicast data and MBMS data differ in scrambling code initial value. Accordingly, there is no guarantee that unicast data and MBMS data can be distinguished by scrambling codes. Furthermore, unicast data and MBMS data may be transmitted at the same time by the use of the same radio resource. As a result, in an environment in which unicast data and MBMS data mingle, it may be impossible to distinguish between them.

To be concrete, there is no guarantee that a scrambling code for a PDSCH (Physical Downlink Shared Channel), which is a radio channel used for transmitting user data in unicast communication, and a scrambling code for a PMCH (Physical Multicast Channel), which is a radio channel used for transmitting user data in MBSFN transmission can be distinguished. As a result, it may be impossible to distinguish between a PDSCH and a PMCH. This may cause interference.

In the case of FIG. 24, it is assumed that the mobile station 121 is at a position where the mobile station 121 can receive both the unicast data r1 and the MBMS data r2 and that the mobile station 123 is at a position where the mobile station 123 can receive both the unicast data r3 and the MBMS data r2.

In this environment, the mobile station 121 or 123 which originally wants to receive unicast data is unable to distinguish MBMS data r2 transmitted from the relay node 110, so that the MBMS data r2 becomes an interference wave.

On the other hand, even if unicast data and MBMS data can be distinguished for a certain period of time, base stations or a base station and a relay node are not necessarily synchronized. Accordingly, timing at which scrambling begins, for example, in one base station gradually deviates from timing at which scrambling begins in the other base station. This degrades code identification capability. As a result, it is impossible to distinguish a PDSCH and a PMCH, and interference occurs.

FIG. 25 illustrates the occurrence of interference caused by a timing deviation. A black slot indicates MBMS data in MBSFN transmission and a white slot indicates unicast data. In a state in which transmission sequences A1 and B1 can be distinguished, two pieces of MBMS data are in the same timing, for example, at a timing T1. Accordingly, the two pieces of MBMS data can be distinguished and interference does not occur. Two pieces of unicast data are in the same timing at a timing T2. Accordingly, the two pieces of unicast data can be distinguished and interference does not occur.

On the other hand, it is assumed that the transmission sequence A1 changes to a transmission sequence A1a due to a timing deviation. In this case, MBMS data and unicast data are in the same timing in the transmission sequences A1a and B1 at each of timings T3 through T6. Accordingly, the MBMS data and the unicast data cannot be distinguished and interference occurs. This degrades the transmission characteristics of one or both of the MBMS data and the unicast data, resulting in degradation in transmission quality.

SUMMARY

According to an aspect of the invention, a radio communication system includes: a first radio station which performs communication by the use of a first radio signal; a second radio station; and a third radio station which is in an area common to a radio communication area of the first radio station and a radio communication area of the second radio station, wherein: the second radio station includes a processor which is configured for converting, upon receiving a second radio signal which is a scrambled radio signal and is indistinguishable from the first radio signal, a communication format of the second radio signal; and the processor is configured for generating a third radio signal by converting a communication format of a scrambled radio signal which is based on the second radio signal and is distinguishable from the first radio signal, and for communicating with the third radio station by the use of the third radio signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
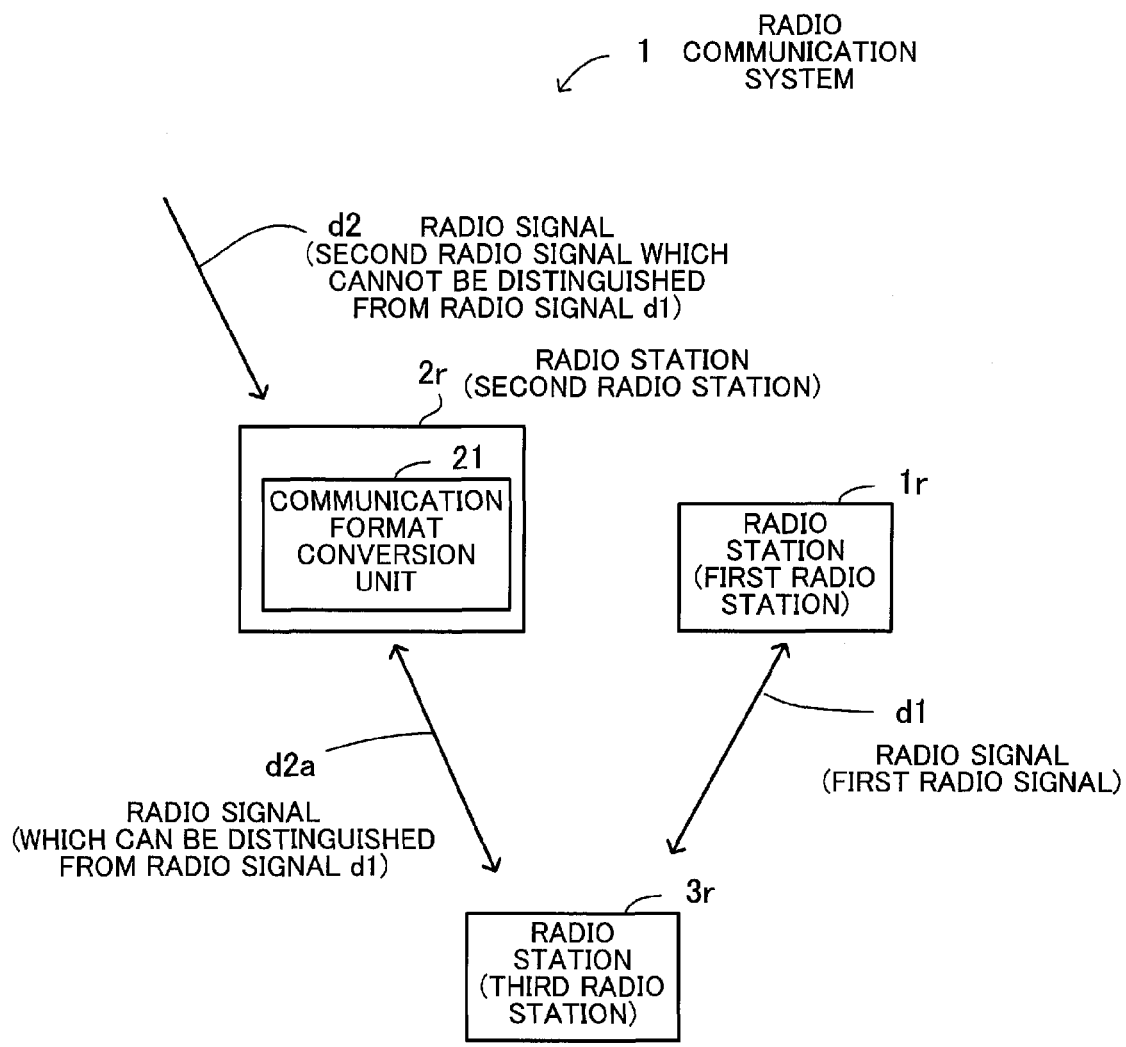
FIG. 1 illustrates an example of the structure of a radio communication system.

Embodiments will now be described with reference to the accompanying drawings. FIG. 1 illustrates an example of the structure of a radio communication system. A radio communication system 1 includes a radio station (first radio station) 1r, a radio station (second radio station) 2r, and a radio station (third radio station) 3r.

The radio station 1r performs communication by the use of a radio signal (first radio signal) d1. The radio station 2r receives a radio signal (second radio signal) d2 on which scrambling that cannot be distinguished from the radio signal d1 is performed. The radio station 2r includes a communication format conversion unit 21. The radio station 3r is in a radio communication area (cell) of the radio station 1r and a cell of the radio station 2r.

Being unable to distinguish the radio signal d1 and the radio signal d2 means being unable to distinguish a code for scrambling which is performed on the radio signal d1 and a code for scrambling which is performed on the radio signal d2.

When the communication format conversion unit 21 included in the radio station 2r receives the radio signal d2, the communication format conversion unit 21 converts a communication format of the radio signal d2 by performing scrambling which can be distinguished from the radio signal d1 on the radio signal d2. By doing so, the communication format conversion unit 21 generates a radio signal d2a (third radio signal). The communication format conversion unit 21 communicates with the radio station 3r by the use of the radio signal d2a.

The contents themselves of a service signal in the radio signal d2a are the same as those of a service signal in the radio signal d2. However, the communication format of the radio signal d2 is converted so that the radio signals d1 and d2a can be distinguished.

As has been described, even if the radio signals d1 and d2 cannot be distinguished, the communication format conversion unit 21 converts the communication format of the radio signal d2 to be distinguished from the radio signal d1. The communication format conversion unit 21 communicates with the radio station 3r by the use of the generated distinguishable radio signal d2a.

In order to make it possible to distinguish the radio signals d1 and d2, it is desirable that frames (or slots included in frames) transmitted from the first and second radio stations should be synchronized. In addition, different radio resources may be used for the radio signals d1 and d2.

The radio signals d1 and d2a can be distinguished, so they do not interfere with each other. Therefore, receiving quality at the radio station 3r and radio transmission quality in the entire system can be improved.

Figure 2:
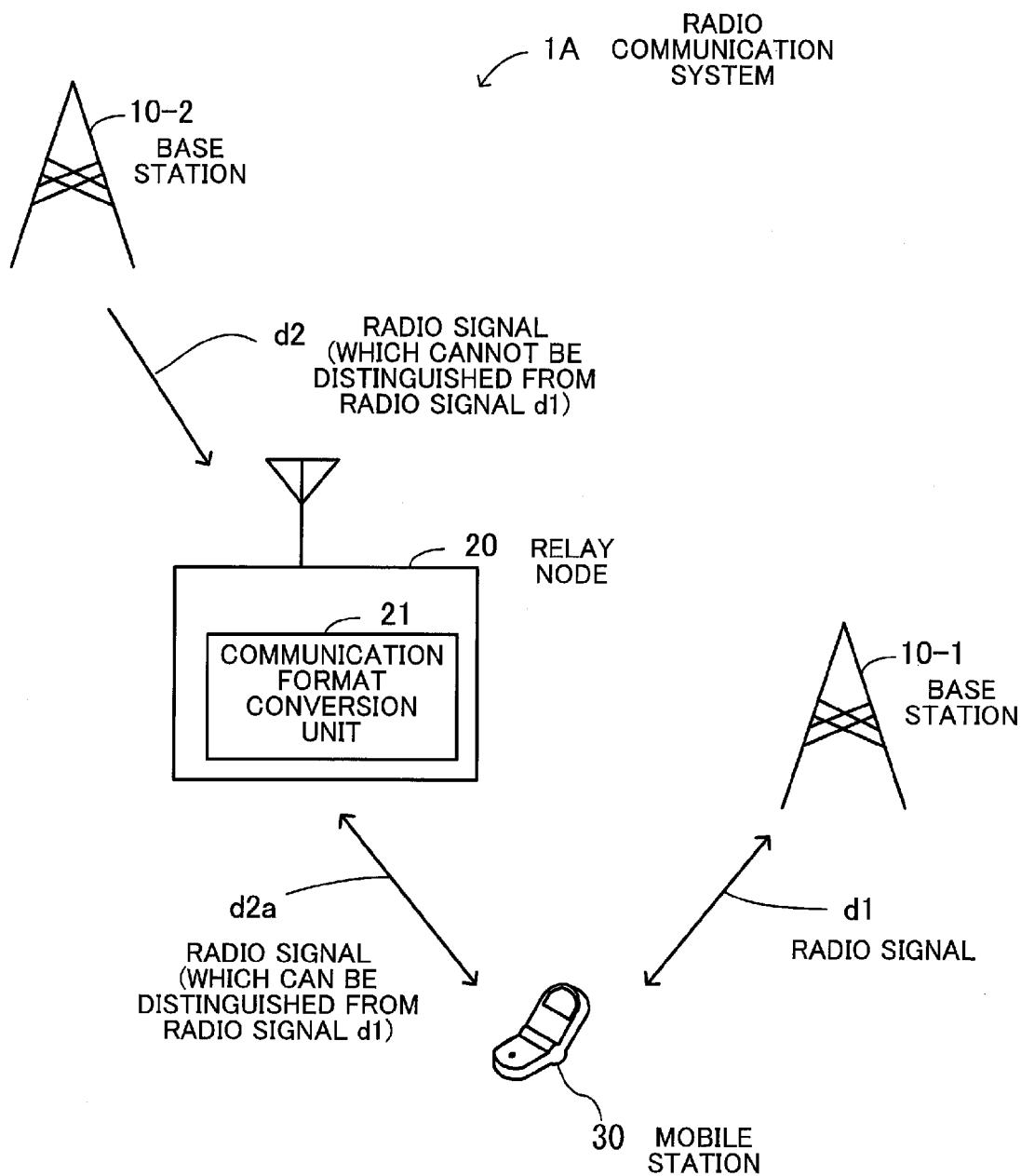
FIG. 2 illustrates an example of the structure of a radio communication system.

FIG. 2 illustrates an example of the structure of a radio communication system. A radio communication system 1A includes a base station (first base station) 10-1, a base station (second base station) 10-2, a relay node 20, and a mobile station 30.

The base station 10-1 performs communication by the use of a radio signal (first radio signal) d1. The base station 10-2 transmits a radio signal (second radio signal) d2 which cannot be distinguished from the radio signal d1. The relay node 20 includes a communication format conversion unit 21 and relays the radio signal d2 transmitted from the base station 10-2.

The communication format conversion unit 21 converts a communication format of the radio signal d2 to a communication format which can be distinguished from the radio signal d1. That is to say, the communication format conversion unit 21 generates a radio signal d2a in the communication format after the conversion and communicates with the mobile station 30 by the use of the radio signal d2a.

If the relay node 20 relays the radio signal d2 received from the base station 10-2 to the mobile station 30 without changing its communication format, the radio signals d1 and d2 cannot be distinguished. Accordingly, interference occurs.

With the radio communication system 1A, on the other hand, the relay node 20 performs relay communication by converting the communication format of the radio signal d2 to a communication format which can be distinguished from the radio signal d1 and by generating the radio signal d2a. As a result, the radio signals d1 and d2a do not interfere with each other. Therefore, receiving quality at the mobile station 30 and radio transmission quality in the entire system can be improved.

Figure 3:
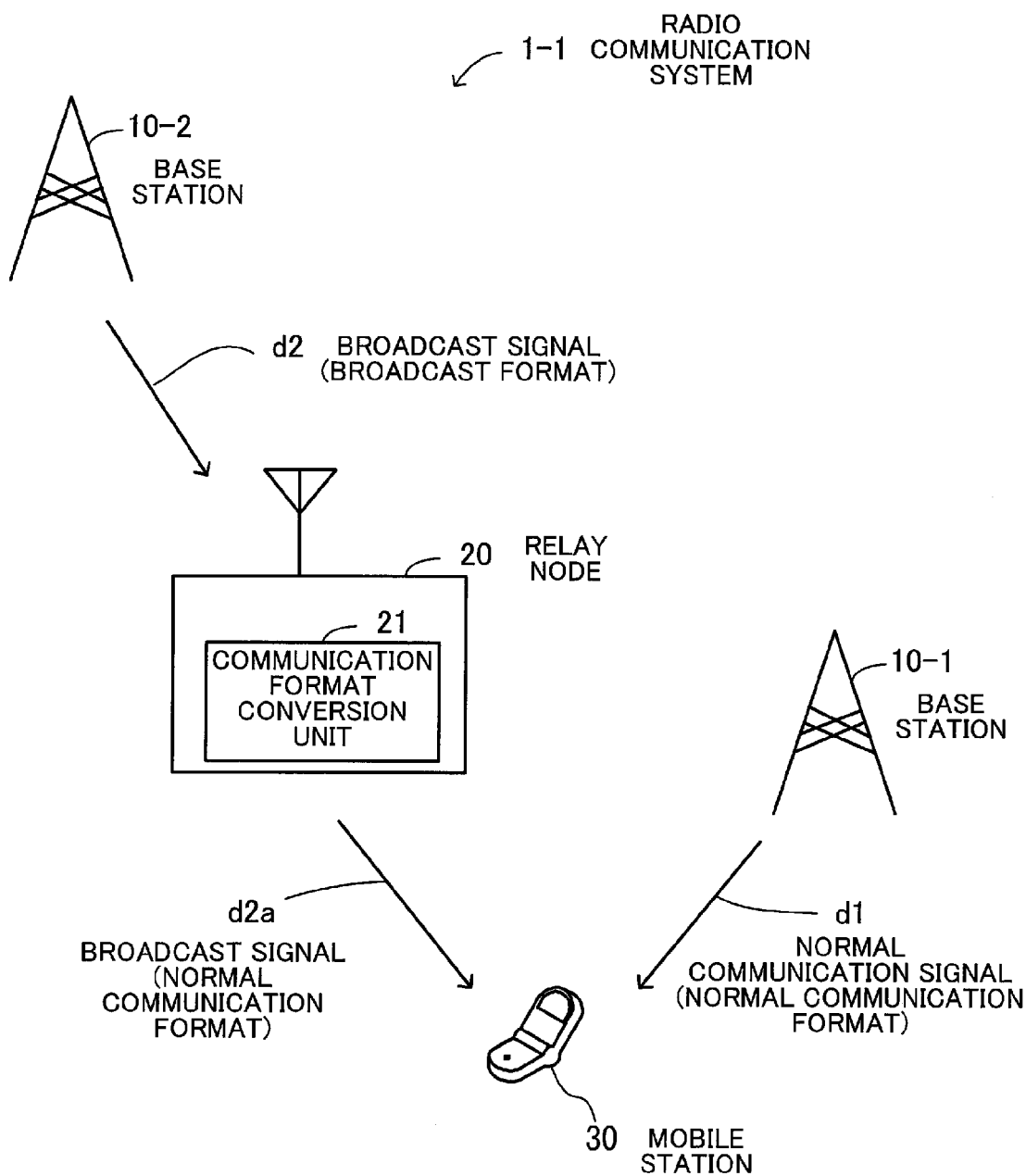
FIG. 3 illustrates an example of the structure of a radio communication system.

FIG. 3 illustrates an example of the structure of a radio communication system. In a radio communication system 1-1 a radio signal d1 is a normal communication signal d1 and a radio signal d2 is a broadcast signal d2. The structure of the radio communication system 1-1 is the same as that of the radio communication system 1A illustrated in FIG. 2.

When a communication format conversion unit 21 receives the broadcast signal d2, the communication format conversion unit 21 converts a broadcast format which is a communication format of the broadcast signal d2 to a normal communication format which is a communication format of the normal communication signal d1, and relay-transmits the broadcast signal d2 in the normal communication format.

A broadcast signal d2a the communication format of which has been converted to the normal communication format is transmitted to a mobile station 30. Even when the mobile station is in an environment in which the mobile station 30 can receive both the normal communication signal d1 and the broadcast signal d2a, the communication format (normal communication format) of the normal communication signal d1 is the same as that of the broadcast signal d2a (that is to say, there is a guarantee that radio signals in the same communication format can be distinguished) and interference does not occur. Therefore, receiving quality at the mobile station 30 and radio transmission quality in the entire system can be improved.

In an example in which the radio communication system 1-1 is applied to MBMS, the structure of a system and operation will now be described. First the structure of an entire MBSFN network to which the radio communication system 1-1 is applied will be described.

Figure 4:
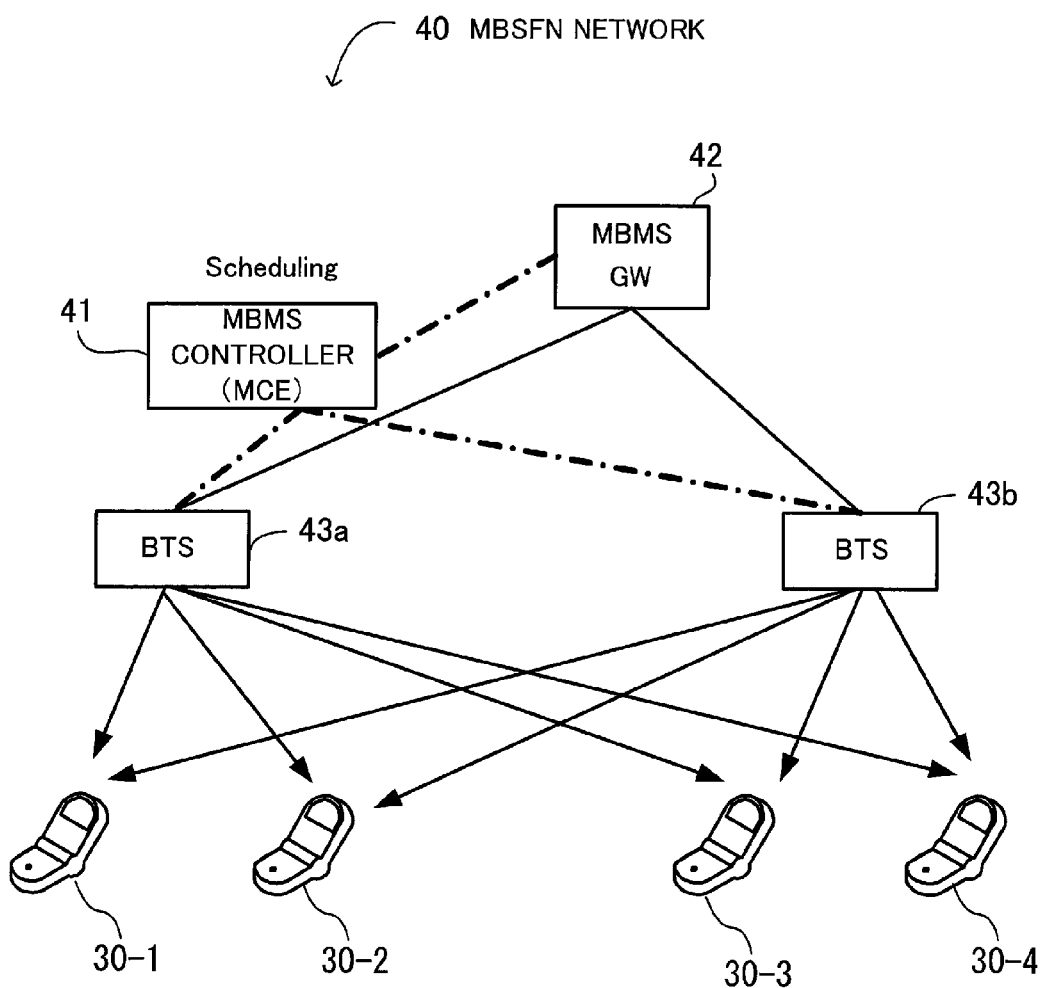
FIG. 4 illustrates a MBSFN network.

FIG. 4 illustrates a MBSFN network. A MBSFN network 40 includes a MBMS controller or MBMS control unit (hereinafter generically named "MBMS controller") 41 which is a MCE (Multi-Cell/Multicast Coordination Entity), a MBMS GW (Gate Way) 42, BTSs (Base Transceiver Stations) 43a and 43b, and mobile stations 30-1 through 30-4.

A MBMS radio signal includes MBMS data and a control signal (hereinafter referred to as a "MBMS control signal") for receiving a MBMS. The MBMS controller 41 controls MBMS transmission for transmitting the MBMS control signal to the MBMS GW 42 and the base transceiver stations 43a and 43b. The MBMS GW 42 transmits the MBMS data to the base transceiver stations 43a and 43b. The MBMS GW 42 stores and manages the MBMS data and may be referred to as a MBMS data storage unit.

Figure 5:
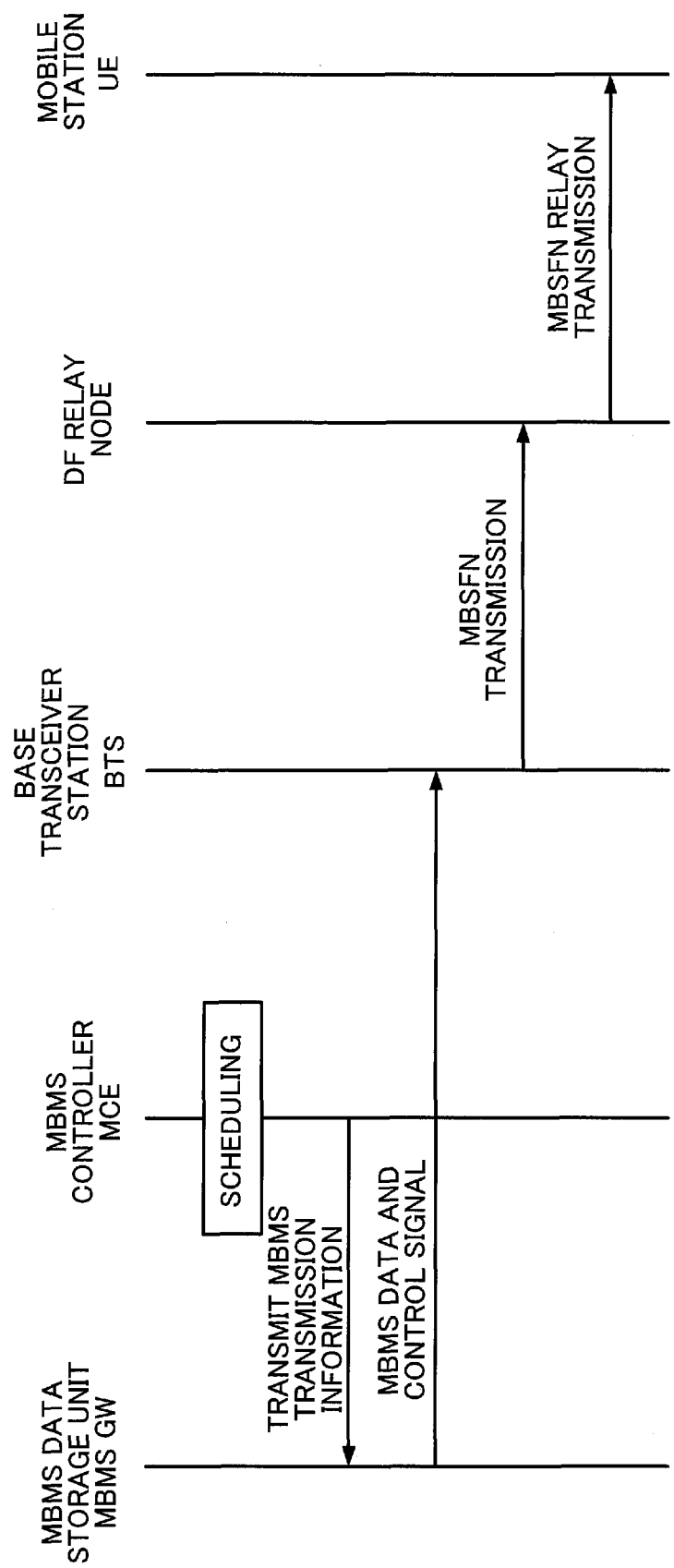
FIG. 5 is a sequence diagram of operation in the MBSFN network.

FIG. 5 is a sequence diagram of operation in the MBSFN network. The MBMS controller 41 performs scheduling to determine MBMS data to be transmitted and its transmission method (such as a modulation scheme, a coding scheme, transmission timing, and a radio frequency to be used). The MBMS controller 41 then gives the MBMS GW 42 notice of information regarding the modulation scheme, the coding scheme, and the like determined and a control signal generated on the basis of the information.

In addition, the MBMS controller 41 requests the MBMS GW 42 to transmit the MBMS data to base transceiver stations. The MBMS GW 42 which receives the notice transmits the control signal (MCCH: Multicast Control Channel) and the MBMS data (MTCH: MBMS Traffic Channel) to the base transceiver station. In addition, the MBMS GW 42 gives the base transceiver station notice of control information, such as the transmission timing and the radio frequency to be used, for MBSFN transmission.

The base transceiver station which receives the notice of the control information, the MBMS data, and the control signal performs MBSFN transmission in accordance with the control information. A DF (Decode and Forward) relay node (which performs processes such as demodulation, error correction decoding, and re-coding and re-modulation on a received radio signal and relays the resultant) which receives the MBSFN transmission performs demodulation and decoding, error correction, and recoding and remodulation and transmits MBMS data obtained to a mobile station.

The MBMS data forms a MTCH which is a logical channel, is mapped to a MCH (Multicast Channel) which is a transport channel, and is radio-transmitted via a PMCH which is a radio channel. When the MBMS data is transmitted, scrambling is performed on the basis of an ID (identifier) according to MBSFN area (see TS36.211).

The MBMS control signal is included in a MCCH which is a logical channel, is mapped to a MCH which is a transport channel, and is radio-transmitted via a PMCH which is a radio channel.

The MBMS controller 41 performs scheduling, such as resource assignment and determination of a MCS (Modulation and Coding Scheme) and MBMS data transmission timing, multiplexes a scheduling result on the MBMS control signal, and transmits it. The base transceiver stations 43a and 43b perform radio transmission on the basis of the scheduling result.

The above MCS (which may also be referred to as AMC (Adaptive Modulation and Coding)) means a modulation and coding scheme. With the MCS a modulation scheme or a coding rate is adaptively changed according to radio channel quality and is used. The MCS includes attributes such as a modulation scheme, a coding rate, and a transmission rate.

With MCS1, for example, a modulation scheme is QPSK (Quadrature Phase Shift Keying), a coding rate is 1/8, and a transmission rate is 1.891 Mb/s. With MCS5 a modulation scheme is 16QAM (Quadrature Amplitude Modulation), a coding rate is 1/2, and a transmission rate is 15.221 Mb/s. Usually an optimum MCS is selected according to the receiving state of a mobile station.

The MBMS controller 41 selects one of a plurality of MCSs. One method for selecting a MCS is to select a MCS with a cell in which a propagation characteristic (propagation environment) is most undesirable as reference and to apply the same MCS selected in the whole of a MBSFN area.

For example, if the determination that communication is performed on the basis of MCS1 in a cell in which a propagation characteristic is most undesirable is made, then MCS1 is applied in all the other cells in a MBSFN area (MCS1 is also applied in a cell in which a propagation characteristic is good). It is also possible to set a certain MCS regardless of a propagation environment.

The operation of a radio communication system in a MBSFN network will now be described concretely. Hereinafter description will be given with unicast data as an example of a normal communication signal, a unicast communication format as an example of a normal communication format, MBMS data as an example of a broadcast signal, and a MBSFN communication format as an example of a broadcast format.

Figure 6:
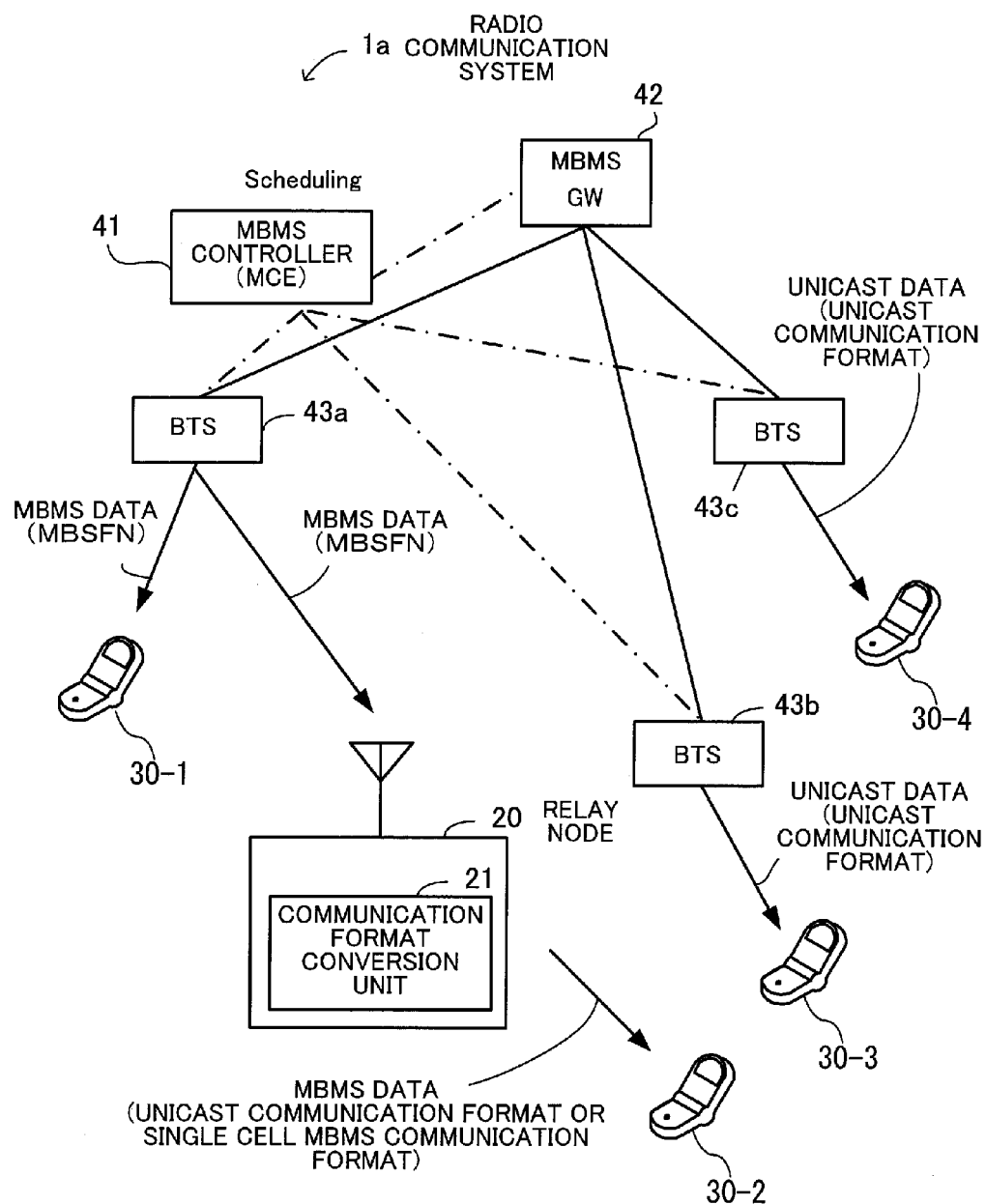
FIG. 6 illustrates a radio communication system in a MBSFN network.

FIG. 6 illustrates a radio communication system in a MBSFN network. A radio communication system 1a includes a MBMS controller 41, a MBMS GW 42, base transceiver stations 43a through 43c, a relay node 20, and mobile stations 30-1 through 30-4. The relay node 20 includes a communication format conversion unit 21.

The base transceiver station 43a transmits MBMS data in the MBSFN communication format to the mobile station 30-1 and the relay node 20. The base transceiver station 43b transmits unicast data in the unicast communication format to the mobile station 30-3. The base transceiver station 43c transmits unicast data in the unicast communication format to the mobile station 30-4.

When the communication format conversion unit 21 included in the relay node 20 receives the MBMS data in the MBSFN communication format, the communication format conversion unit 21 converts the MBSFN communication format to the unicast communication format and transmits the MBMS data in the unicast communication format.

It is assumed that the mobile station 30-2 receives data relayed by the relay node 20 and that the mobile station 30-2 is in an area where the mobile station 30-2 can also receive unicast data transmitted from the base transceiver station 43b.

If the relay node 20 relay-transmits the MBMS data in the MBSFN communication format to the mobile station 30-2 under these conditions, then the mobile station 30-2 receives both the MBMS data in the MBSFN communication format and the unicast data in the unicast communication format.

With the MBSFN communication format the MBMS data is transmitted via a radio channel PMCH. With the unicast communication format the unicast data is transmitted via a radio channel PDSCH. However, there is no guarantee that a code for scrambling performed on a PMCH and a code for scrambling performed on a PDSCH can be distinguished. Accordingly, it may be impossible to distinguish these codes. As a result, the MBMS data interferes with the unicast data at the mobile station 30-2.

On the other hand, it is assumed that the relay node includes the communication format conversion unit 21. When the communication format conversion unit 21 receives the MBMS data in the MBSFN communication format, the communication format conversion unit 21 changes the communication format of the MBMS data from the MBSFN communication format to the unicast communication format and relay-transmits the MBMS data in the unicast communication format.

That is to say, the MBSFN communication format is converted to the unicast communication format (radio data format using an extended CP is converted to a radio data format using a normal CP), so the MBMS data can be transmitted not via a radio channel PMCH but via a radio channel PDSCH.

As a result, the MBMS data in the unicast communication format transmitted from the relay node 20 does not interfere with the unicast data in the unicast communication format transmitted from the base transceiver station 43b.

That is to say, the MBMS data and the unicast data are transmitted via radio channels PDSCH, so there is a guarantee that the MBMS data and the unicast data can be distinguished. This can prevent interference. Accordingly, the mobile station 30-2 can sensitively receive the MBMS data which is transmitted from the relay node 20 and which the mobile station 30-2 originally wants to receive.

In the above description the communication format conversion unit 21 changes the communication format of the MBMS data from the MBSFN communication format to the unicast communication format and relay-transmits the MBMS data. By changing the communication format of the MBMS data from the MBSFN communication format to a single cell MBMS communication format and relay-transmitting the MBMS data, however, the occurrence of interference can also be prevented. A single cell MBMS will now be described.

With a LTE system not only MBSFN transmission but also single cell MBMS transmission (term "single cell transmission" is used in TS36.300, but in this specification the term "single cell MBMS transmission" is used for differentiating it from unicast transmission) by which MBMS data is transmitted only to a specific cell is discussed.

With the MBSFN transmission MBMS data is transmitted to the whole of an area which is a group of cells. With the single cell MBMS transmission, unlike the MBSFN transmission, MBMS data is transmitted only to a specific cell. Accordingly, there is no need for a plurality of base transceiver stations to transmit the same data at the same frequency at the same timing. As a result, each base transceiver station performs scheduling.

Moreover, MBMS data is transmitted to one cell, so propagation distance is short compared with the MBSFN transmission. As a result, CP length can be made shorter. In other words, a normal CP used in the unicast communication can be used. This means that the unicast transmission can be performed. That is to say, transmission can be performed by the use of a PDSCH which is a radio channel used in the unicast communication.

Therefore, when the communication format conversion unit 21 receives the MBMS data in the MBSFN communication format, the communication format conversion unit 21 may convert the MBSFN communication format to the unicast communication format or a single cell MBMS communication format. By relay-transmitting the MBMS data in the unicast communication format or the single cell MBMS communication format, the occurrence of interference at the mobile station can be prevented.

Figure 7:
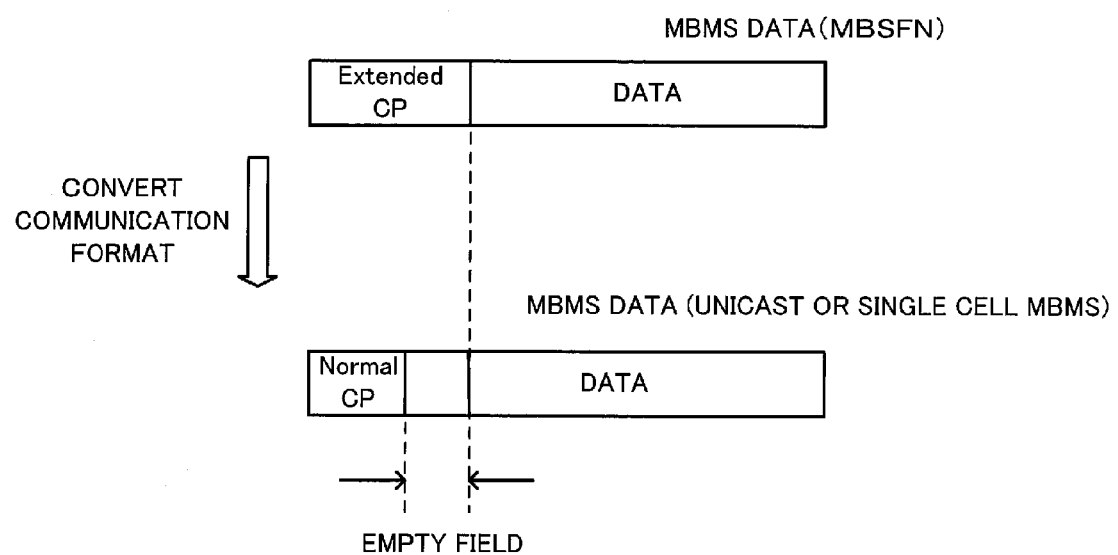
FIG. 7 illustrates the replacement of a CP.

Format conversion (replacement of a redundant portion (CP)) will now be described. FIG. 7 illustrates the replacement of a CP. When the communication format conversion unit 21 converts the MBSFN communication format to the unicast communication format or the single cell MBMS communication format, the communication format conversion unit 21 performs data format conversion by replacing an extended CP with a normal CP.

By adding a short normal CP to received data, the amount of information which can be transmitted can be increased by the use of an empty field (because (length of normal CP)< (length of extended CP) or transmission can be performed with a coding rate decreased and the number of parity bits increased. As a result, a transmission characteristic can be improved (transmission may be performed with a coding rate unchanged and 0's or 1's inserted into unused bits as padding characters).

Figure 8:
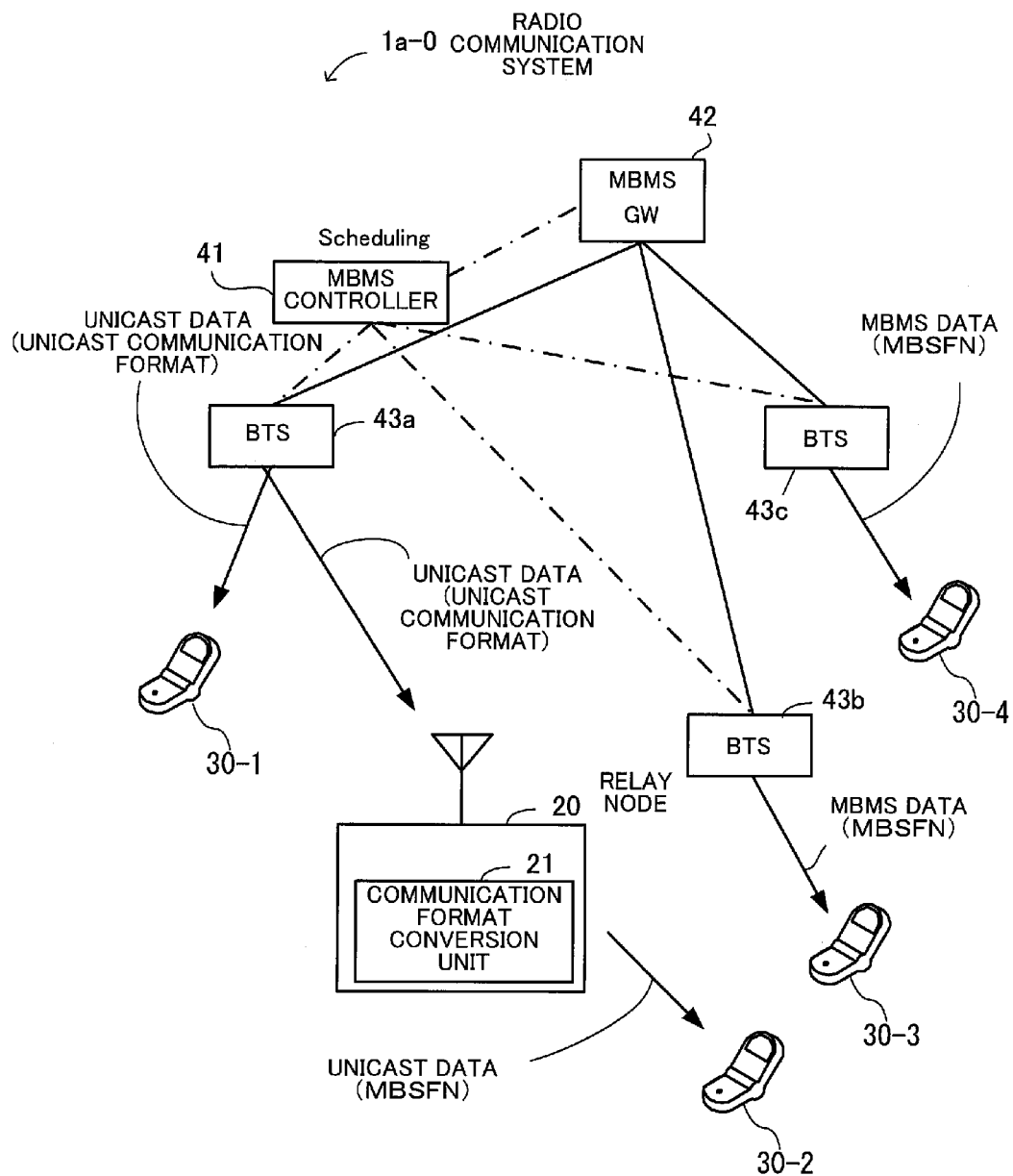
FIG. 8 illustrates the structure of a radio communication system.

The case where the unicast communication format is converted to the MBSFN communication format will now be described. FIG. 8 illustrates the structure of a radio communication system. The structure of a radio communication system 1a-0 is the same as that of the radio communication system 1a illustrated in FIG. 6. In the case of FIG. 8, however, the unicast communication format is converted to the MBSFN communication format.

A base transceiver station 43a transmits unicast data in the unicast communication format to a mobile station 30-1 and a relay node 20. A base transceiver station 43b transmits MBMS data in the MBSFN communication format to a mobile station 30-3. A base transceiver station 43c transmits MBMS data in the MBSFN communication format to a mobile station 30-4.

When a communication format conversion unit 21 included in the relay node 20 receives the unicast data in the unicast communication format, the communication format conversion unit 21 converts the unicast communication format to the MBSFN communication format and transmits the unicast data in the MBSFN communication format (radio data format using a normal CP is converted to a radio data format using an extended CP).

As a result, the unicast data in the MBSFN communication format transmitted from the relay node 20 does not interfere with the MBMS data in the MBSFN communication format transmitted from the base transceiver station 43b. A communication format conversion reverse to that described in FIG. 6 can also be made in this way.

The structure of the relay node 20 will now be described. Methods of relay by the relay node 20 are broadly divided into an AF (Amplify and Forward) method and the DF method. With the AF method a relay node receives a radio signal transmitted from a base transceiver station or a mobile station, amplifies the received radio signal, and transmits a radio signal obtained to a mobile station or a base transceiver station.

With the DF method, as described above, a relay node receives a radio signal transmitted from a base transceiver station or a mobile station, performs an error correction process by demodulation and decoding, performs coding and modulation again, and transmits a signal obtained to a mobile station or a base transceiver station. The structure of the relay node 20 having the DF function will now be described.

Figure 9:
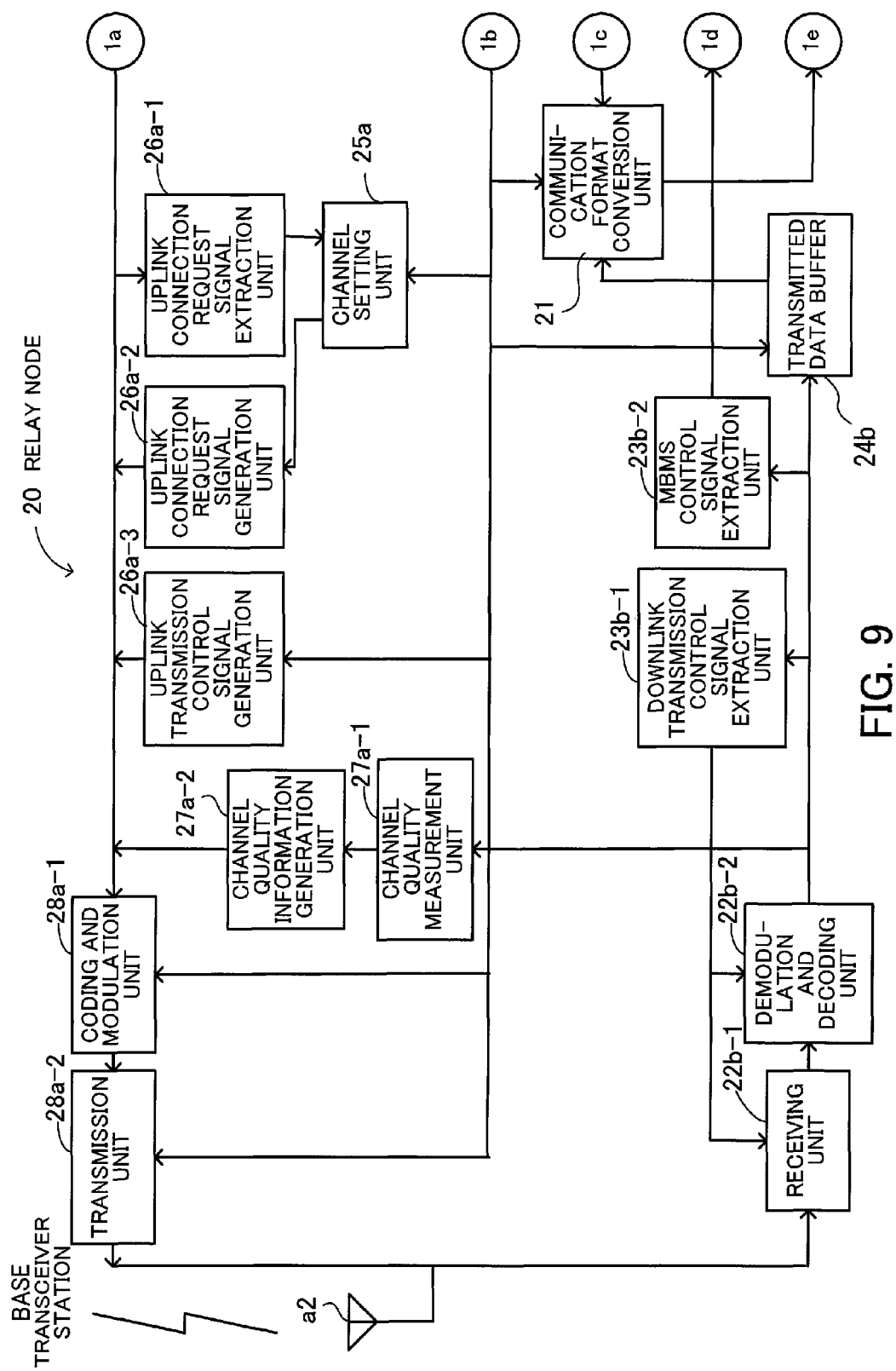
FIG. 9 illustrates the structure of a relay node.
Figure 10:
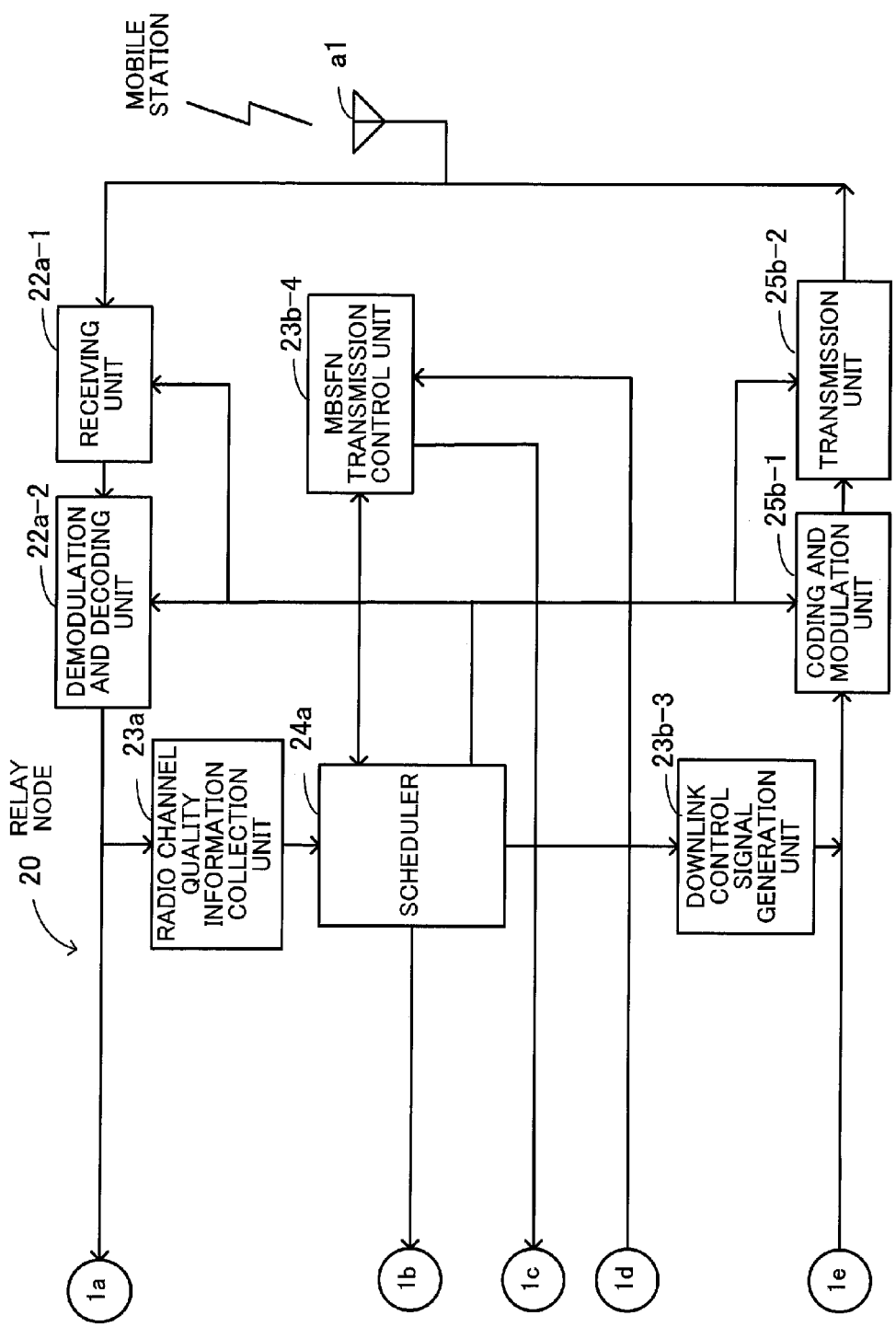
FIG. 10 illustrates the structure of the relay node.

FIGS. 9 and 10 illustrate the structure of the relay node 20. The relay node 20 includes an antenna a1, a receiving unit 22a-1, a demodulation and decoding unit 22a-2, a radio channel quality information acquisition unit 23a, a scheduler 24a, a channel setting unit 25a, an uplink connection request signal extraction unit 26a-1, an uplink connection request signal generation unit 26a-2, an uplink transmission control signal generation unit 26a-3, a channel quality measurement unit 27a-1, a channel quality information generation unit 27a-2, a coding and modulation unit 28a-1, and a transmission unit 28a-2.

In addition, the relay node 20 includes an antenna a2, a receiving unit 22b-1, a demodulation and decoding unit 22b-2, a downlink transmission control signal extraction unit 23b-1, a MBMS control signal extraction unit 23b-2, a downlink control signal generation unit 23b-3, a MBSFN transmission control unit 23b-4, a transmitted data buffer 24b, a communication format conversion unit 21, a coding and modulation unit 25b-1, and a transmission unit 25b-2.

On the basis of a scheduling result, the receiving unit 22a-1 and the demodulation and decoding unit 22a-2 receive an uplink radio signal transmitted from a mobile station via the antenna a1, down-convert it, and demodulate and decode an uplink signal after the down-conversion.

The radio channel quality information collection unit 23a collects radio channel quality information (indicator of the quality of a radio channel between the relay node and the mobile station) from the uplink signal after the demodulation and decoding and transmits the radio channel quality information to the scheduler 24a.

The uplink connection request signal extraction unit 26a-1 extracts an uplink connection request signal from the uplink signal after the demodulation and decoding and transmits the uplink connection request signal to the channel setting unit 25a. When the channel setting unit 25a receives the uplink connection request signal, the channel setting unit 25a transmits uplink connection request signal generation instructions on the basis of the scheduling result.

When the uplink connection request signal generation unit 26a-2 receives the uplink connection request signal generation instructions, the uplink connection request signal generation unit 26a-2 generates an uplink connection request signal. The uplink transmission control signal generation unit 26a-3 generates an uplink transmission control signal on the basis of the scheduling result.

The channel quality measurement unit 27a-1 measures the quality of a channel between a base transceiver station and the relay node 20 and transmits a measurement result to the channel quality information generation unit 27a-2. The channel quality information generation unit 27a-2 generates channel quality information on the basis of the measurement result.

On the basis of the scheduling result, the coding and modulation unit 28a-1 and the transmission unit 28a-2 code and modulate the uplink connection request signal, the uplink transmission control signal, and the channel quality information, multiplex these signals on one another, up-convert a signal obtained, and transmit the signal to the base transceiver station via the antenna a2.

On the basis of information regarding coding and modulation included in a downlink transmission control signal, the receiving unit 22b-1 and the demodulation and decoding unit 22b-2 receive via the antenna a2 a downlink radio signal transmitted from the base transceiver station, down-convert it, and demodulate and decode a downlink signal after the down-conversion. The downlink transmission control signal extraction unit 23b-1 extracts the downlink transmission control signal from the downlink signal and transmits it to the receiving unit 22b-1 and the demodulation and decoding unit 22b-2.

The MBMS control signal extraction unit 23b-2 extracts a MBMS control signal from the downlink signal and transmits it to the MBSFN transmission control unit 23b-4. The MBSFN transmission control unit 23b-4 sets MBSFN control in the scheduler 24a.

The transmitted data buffer 24b buffers the downlink signal and outputs data on the basis of a scheduling result. The communication format conversion unit 21 converts the communication format of the downlink signal after the buffering (MBSFN→unicast, for example). The downlink control signal generation unit 23b-3 generates a downlink control signal on the basis of the scheduling result.

On the basis of the scheduling result, the coding and modulation unit 25b-1 and the transmission unit 25b-2 code and modulate the downlink control signal and the downlink signal after the communication format conversion, up-convert them, and transmit them to the mobile station via the antenna a1.

Figure 11:
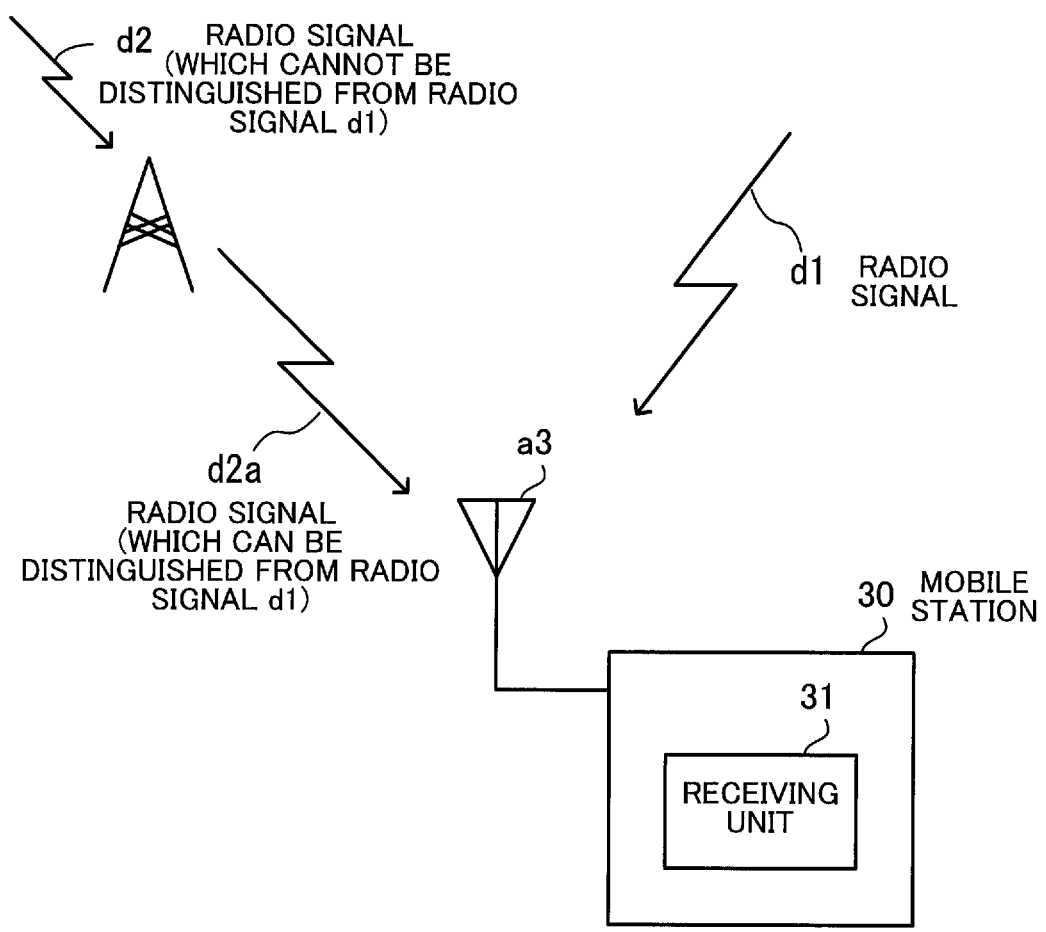
FIG. 11 illustrates the structure of a mobile station.

The structure of a mobile station will now be described. FIG. 11 illustrates the structure of a mobile station. A mobile station 30 includes an antenna a3 and a receiving unit 31. It is assumed that the mobile station 30 is in an area where the mobile station 30 can receive a radio signal (first radio signal) d1 and a radio signal (second radio signal) d2 which cannot be distinguished from the radio signal d1.

When the receiving unit 31 receives the radio signal d1, the receiving unit 31 performs a process for receiving the radio signal d1. Alternatively, a communication format of the radio signal d2 is converted on the mobile station 30 side to a communication format which can be distinguished from the radio signal d1, and the receiving unit 31 performs a process for receiving a radio signal d2a in the communication format after the conversion.

Detailed operation in a radio communication system will now be described. In a first embodiment operation performed at the time of converting the MBSFN communication format to the unicast communication format and performing relay transmission will be described. A relay node included in a radio communication system has a MBMS scheduling function.

Figure 12:
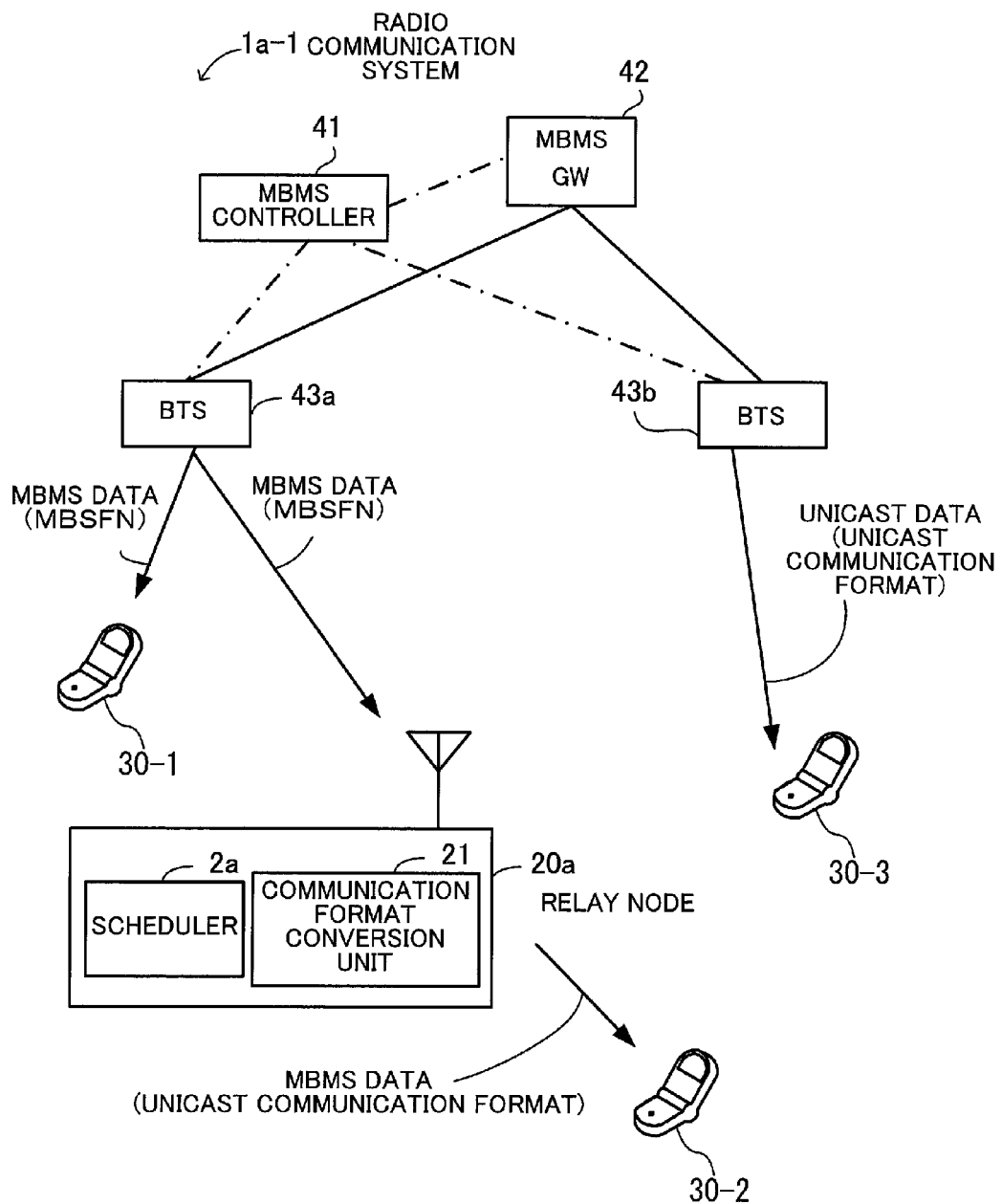
FIG. 12 illustrates the structure of a radio communication system.

FIG. 12 illustrates the structure of a radio communication system. A radio communication system 1a-1 includes a MBMS controller 41, a MBMS GW 42, base transceiver stations 43a and 43b, a relay node 20a, and mobile stations 30-1 through 30-3. The relay node 20a includes a communication format conversion unit 21 and a scheduler 2a.

The relay node 20*a* originally includes a scheduler for unicast communication. However, the scheduler 2*a* has not only a unicast communication scheduling function but also a MBMS scheduling function.

The base transceiver station 43*a* transmits MBMS data in the MBSFN communication format to the mobile station 30-1 and the relay node 20*a*. The base transceiver station 43*b* transmits unicast data in the unicast communication format to the mobile station 30-3.

When the communication format conversion unit 21 included in the relay node 20*a* receives the MBMS data in the MBSFN communication format, the communication format conversion unit 21 converts the MBSFN communication format to the unicast communication format and transmits the MBMS data in the unicast communication format to the mobile station 30-2.

The mobile station 30-2 requests the MBMS controller 41 via the relay node 20*a* and the base transceiver station 43*a* to relay MBSFN transmission. The relay node 20*a* which receives the request requests the MBMS controller 41 via the base transceiver station 43*a* to relay MBSFN transmission and transmit MBMS control information managed by the MBMS controller 41 to the relay node 20*a*.

Figure 13:
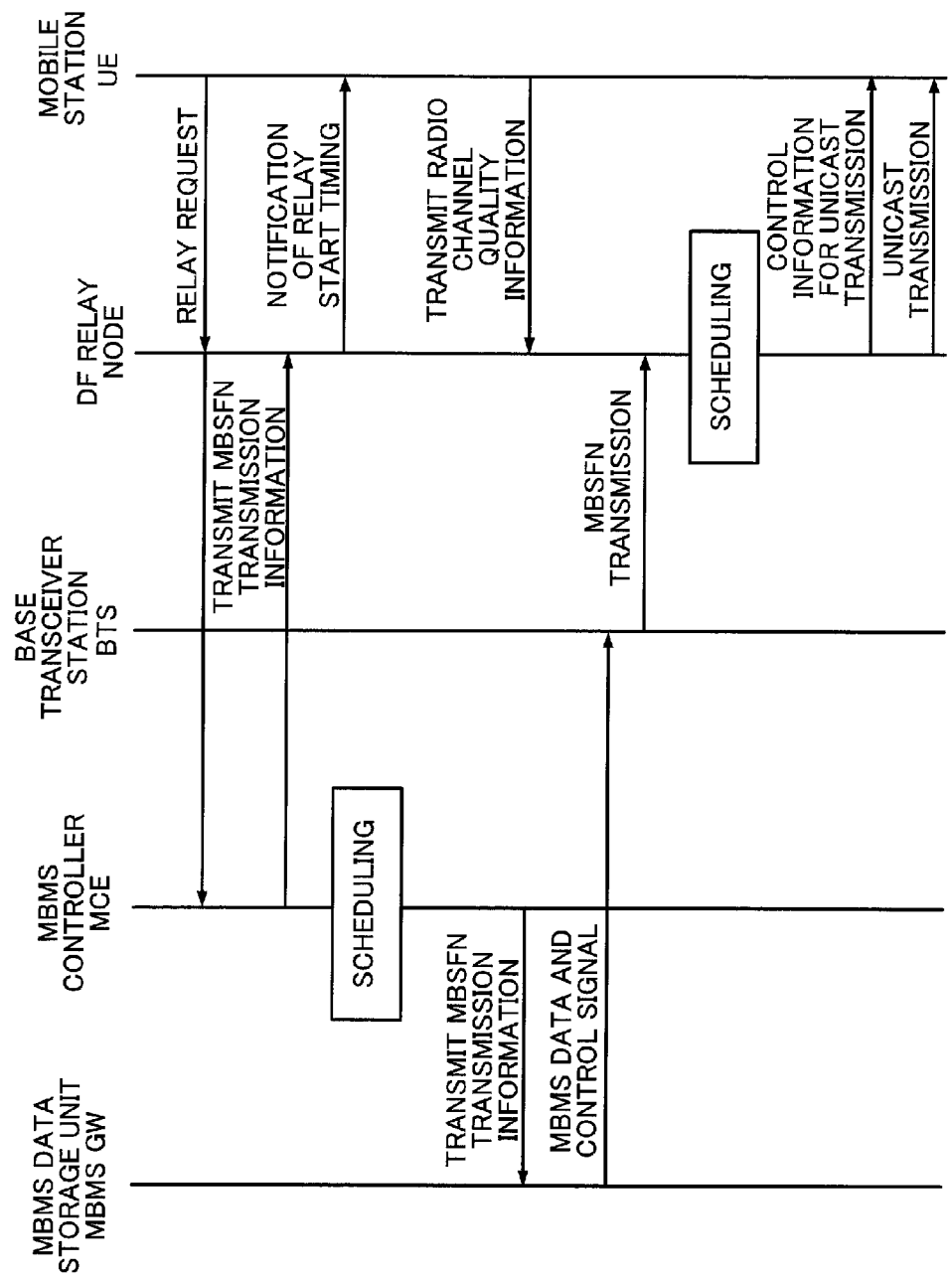
FIG. 13 is a sequence diagram of operation.

FIG. 13 is a sequence diagram of operation. In FIG. 13, it is assumed that a relay request from a mobile station is transmitted to at least a DF relay node, that the relay request is transmitted to a base transceiver station via the DF relay node, and that the relay request is transmitted to a MBMS controller via the base transceiver station.

The MBMS controller which receives the relay request transmits MBSFN transmission information (information indicative of the type of transmitted MBMS data, the MBMS data which has already been transmitted, and the like) held by the MBMS controller to the DF relay node so that the DF relay node will change the communication format of received MBMS data from the MBSFN communication format to the unicast communication format and so that the DF relay node will transmit the MBMS data to the mobile station. In FIG. 13, the MBMS controller transmits the MBSFN transmission information before scheduling. However, the MBMS controller may transmit the MBSFN transmission information after scheduling.

In addition, the mobile station may transmit radio channel quality information to the DF relay node after MBSFN transmission from the base transceiver station to the DF relay node. Furthermore, it is necessary that the DF relay node should give the mobile station notice of relay start timing before unicast communication. MBMS data is transmitted to the DF relay node by the MBSFN transmission.

On the basis of the radio channel quality information transmitted from the mobile station, the DF relay node which receives the MBMS data generates MBMS control information to be transmitted to the mobile station by the use of at least one of MBMS control information transmitted from the MBMS controller and MBMS control information included in the MBMS data transmitted from the base transceiver station. The DF relay node transmits the MBMS control information to the mobile station as control information for unicast communication and then transmits the MBMS data.

The MBMS controller which receives a request to transmit the MBMS control information transmits the MBMS control information including, for example, information regarding a service received by the mobile station to the DF relay node via the base transceiver station. Control information indicative of a part of service data which has already been received by the mobile station can be taken as a concrete example of the MBMS control information regarding the service. This control information is important in maintaining the continuity of the service.

On the basis of the above MBMS control information, the DF relay node generates a MBMS control signal and generates a MCCH which is a logical channel. This MCCH is mapped to a MCH which is a transport channel, and is radio-transmitted via a PMCH which is a radio channel.

If MBMS control information is not transmitted from the MBMS controller or if the DF relay node cannot generate a MBMS control signal (cannot generate a MCCH, for example), then the DF relay node informs the mobile station that it cannot relay MBSFN transmission, and does not relay MBSFN transmission.

If the number of mobile stations which request MBSFN transmission relay is smaller or greater than a threshold set in advance, then the DF relay node does not relay MBSFN transmission and informs the mobile stations that the DF relay node does not relay MBSFN transmission.

A mobile station which is informed that the DF relay node cannot relay MBSFN transmission performs hand-over to another relay node or the base transceiver station. To be concrete, the mobile station measures receiving power from other relay nodes or the base transceiver station and selects a relay node or the base transceiver station from which receiving power is the highest as a hand-over destination, and performs hand-over to it.

On the basis of the channel quality (or an indicator of the quality) of a downlink between the relay node 20*a* and the mobile station 30-2 transmitted from the mobile station 30-2, the scheduler 2*a* included in the relay node 20*a* then performs scheduling in the same way that is used for transmitting unicast data between the relay node 20*a* and the mobile station 30-2. The scheduler 2*a* determines radio resources for transmitting MBMS data and a MBMS control signal and a modulation scheme.

The scheduler 2*a* may equally perform scheduling of unicast data and relayed MBMS data or preferentially perform scheduling of unicast data or relayed MBMS data. In addition, the scheduler 2*a* may perform scheduling of unicast data communication and MBMS data communication separately.

As stated above, the relay node 20*a* receives the MBMS control information and performs scheduling. If the relay node 20*a* can relay MBSFN transmission as a result of scheduling, then the relay node 20*a* informs the mobile station 30-2 which makes a request to relay MBSFN transmission that the relay node 20*a* can relay MBSFN transmission.

That is to say, the relay node 20*a* uses control information for giving the mobile station 30-2 notice that the relay node 20*a* relays the MBMS data in the unicast communication format. The mobile station 30-2 which receives the notice receives a downlink physical control channel (DPCCH). By doing so, the mobile station 30-2 extracts control information (MCS and the like) for downlink unicast data communication and receives a downlink radio channel PDSCH including the MBMS data in accordance with the MBMS control information.

If the mobile station 30-2 which receives the PDSCH radio channel can receive the MBMS data without errors, then the mobile station 30-2 returns an ACK to the relay node 20*a*. If the mobile station 30-2 receives the MBMS data including errors, then the mobile station 30-2 returns a NACK to the relay node 20*a* (MBMS data relay method in which an ACK or a NACK is not returned can be adopted).

A process performed for relaying MBMS data will now be described. When the relay node 20a receives MBMS data transmitted from the base transceiver station 43a, the relay node 20a converts the received data mapped to a slot format using an extended CP to a slot format using a normal CP. The relay node 20a then performs coding and modulation on the data and transmits the data to the mobile station 30-2.

On the basis of a transmission control signal transmitted from the relay node 20a by the use of a DPCCH, the mobile station 30-2 sets a demodulation scheme and a decoding scheme. By receiving a PDSCH by which unicast data is transmitted, the mobile station 30-2 receives the MBMS data.

In the above description the mobile station 30-2 makes a request via the relay node 20a to relay MBSFN transmission. As a result of hand-over, however, the base transceiver station or its upper radio channel control station may request the relay node 20a to relay MBSFN transmission.

Furthermore, the relay node 20a generates a MCCH. However, the following method may be used. The relay node 20a manages the MBMS control information. When the relay node 20a transmits the MBMS data, the relay node 20a informs the MBMS controller 41 of the MBMS control information and the MBMS controller 41 generates a MCCH.

As has been described, the relay node 20a relays MBMS data which it receives to the mobile station 30-2 in the unicast communication format. As a result, it is possible to relay the MBMS data without causing interference.

In addition, a radio data format using an extended CP is converted to a radio data format using a normal CP at communication format conversion time. As a result, transmission can be performed with a coding rate decreased and the number of parity bits increased. Therefore, a transmission characteristic or a transmission rate can be improved.

Moreover, on the basis of the quality of a downlink between the relay node 20a and the mobile station 30-2 transmitted from the mobile station 30-2, scheduling is performed in the same way that is used for transmitting unicast data between the relay node 20a and the mobile station 30-2. By doing so, an optimum transmission method can be selected. As a result, a transmission characteristic or a transmission rate can be improved.

Figure 14:
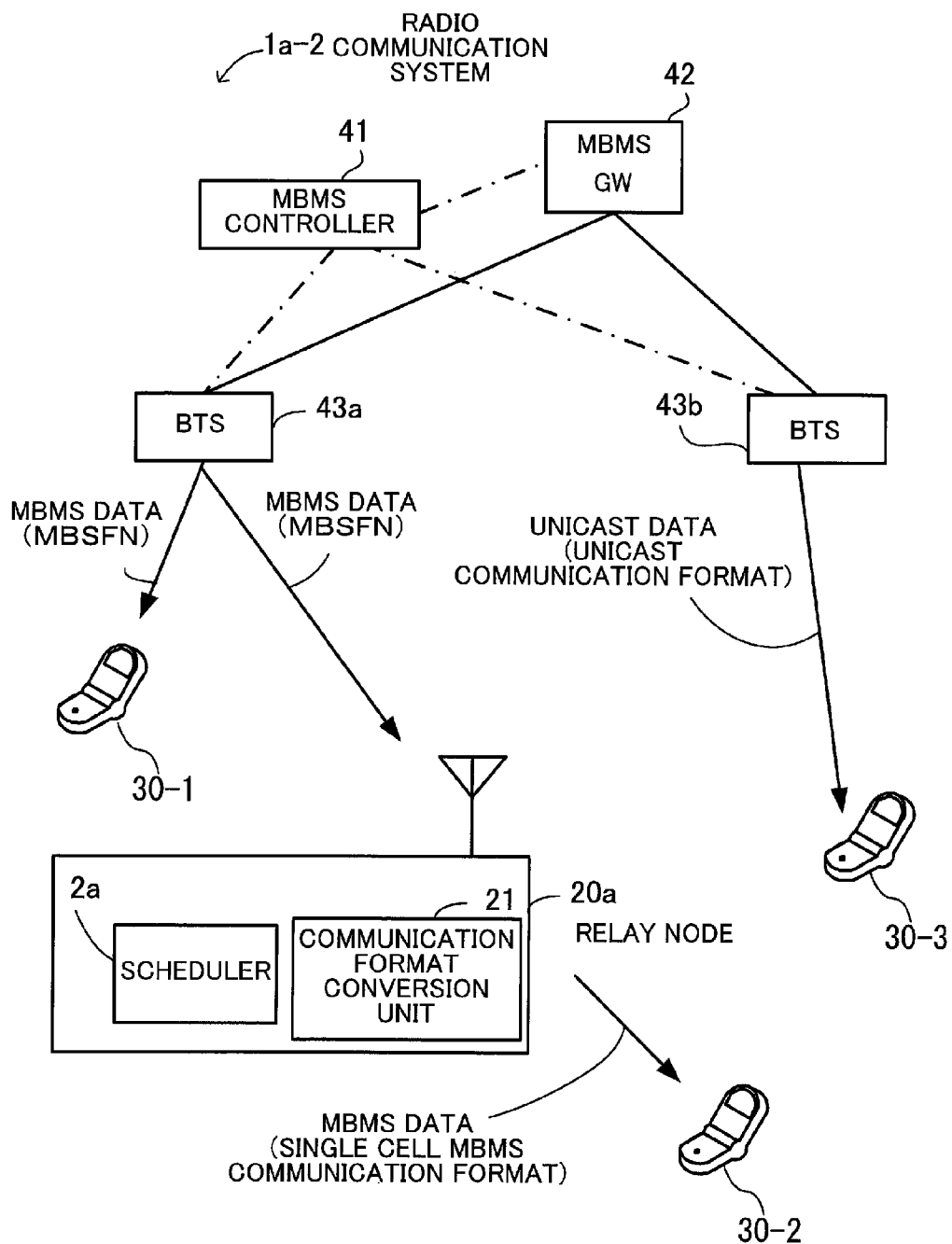
FIG. 14 illustrates the structure of a radio communication system.

Operation for converting the MBSFN communication format to the single cell MBMS communication format and performing relay transmission will now be described as a second embodiment. FIG. 14 illustrates the structure of a radio communication system. The structure of a radio communication system 1a-2 is the same as that of the radio communication system 1a-1 illustrated in FIG. 12. The radio communication system 1a-2 differs from the radio communication system 1a-1 in that a communication format conversion unit 21 converts the MBSFN communication format to the single cell MBMS communication format.

A mobile station 30-2 makes a request to relay MBSFN transmission. A base transceiver station 43a requests a MBMS controller 41 to transmit MBMS control information to a relay node 20a. This is the same with the first embodiment.

The MBMS controller 41 which is requested to transmit the MBMS control information transmits the MBMS control information to the relay node 20a in response to the request. On the basis of the transmitted MBMS control information, the relay node 20a generates a control signal and generates a MCCH which is a logical channel. The relay node 20a maps this MCCH to a DL-SCH (Downlink Shared Channel) which is a transport channel, and performs single cell MBMS transmission by the use of a PMCH which is a radio channel.

With single cell MBMS transmission a short CP can be used. This is the same with unicast transmission. Accordingly, the relay node 20a receives MBMS data transmitted from the base transceiver station 43a by the use of an extended CP, and performs demodulation and decoding. After that, the relay node 20a converts the format of the MBMS data to the format using a normal CP, performs coding and modulation on the MBMS data, and transmits the MBMS data to the mobile station 30-2. This is the same with the first embodiment.

A third embodiment will now be described. In the third embodiment a base transceiver station carries out a MBMS scheduling function. In addition, a plurality of relay nodes is installed.

Figure 15:
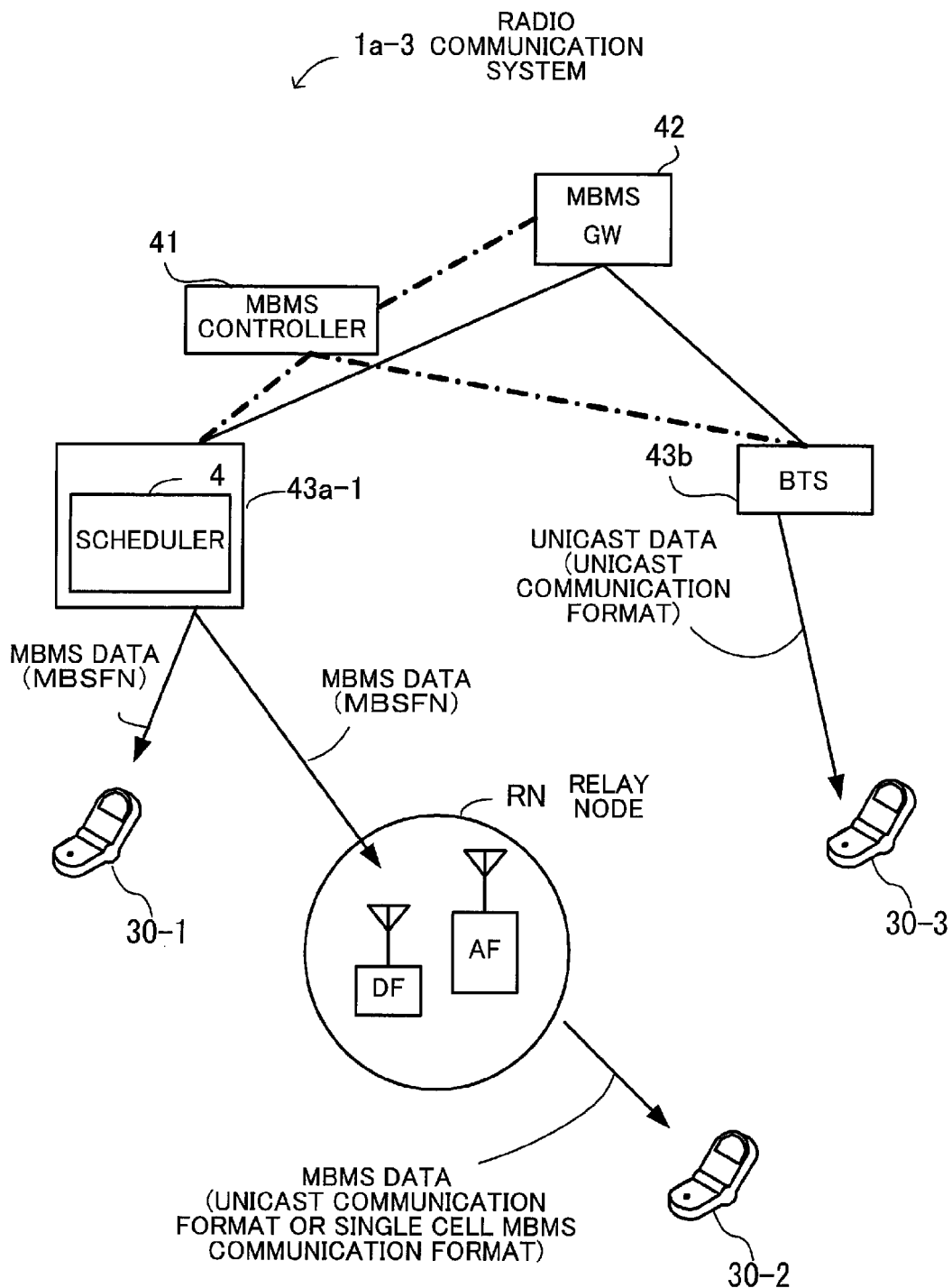
FIG. 15 illustrates the structure of a radio communication system.

FIG. 15 illustrates the structure of a radio communication system. A radio communication system 1a-3 includes a MBMS controller 41, a MBMS GW 42, base transceiver stations 43a-1 and 43b, a relay node RN, and mobile stations 30-1 through 30-3. The base transceiver station 43a-1 includes a MBMS scheduler 4.

AF relay nodes $RN_{AF}$ and DF relay nodes $RN_{DF}$ may mingle. The case where AF relay nodes $RN_{AF}$ and DF relay nodes $RN_{DF}$ mingle in a cell of the base transceiver station 43a-1 or one DF relay node is in a cell of the base transceiver station 43a-1 (FIG. 15 indicates a relay node group in which AF relay nodes $RN_{AF}$ and DF relay nodes $RN_{DF}$ mingle as a relay node RN) and where the base transceiver station 43a-1 performs scheduling of communication between all the relay nodes and the mobile station 30-2 will be described (AF relay node does not perform demodulation or decoding, so it does not carry out communication format conversion).

Figure 16:
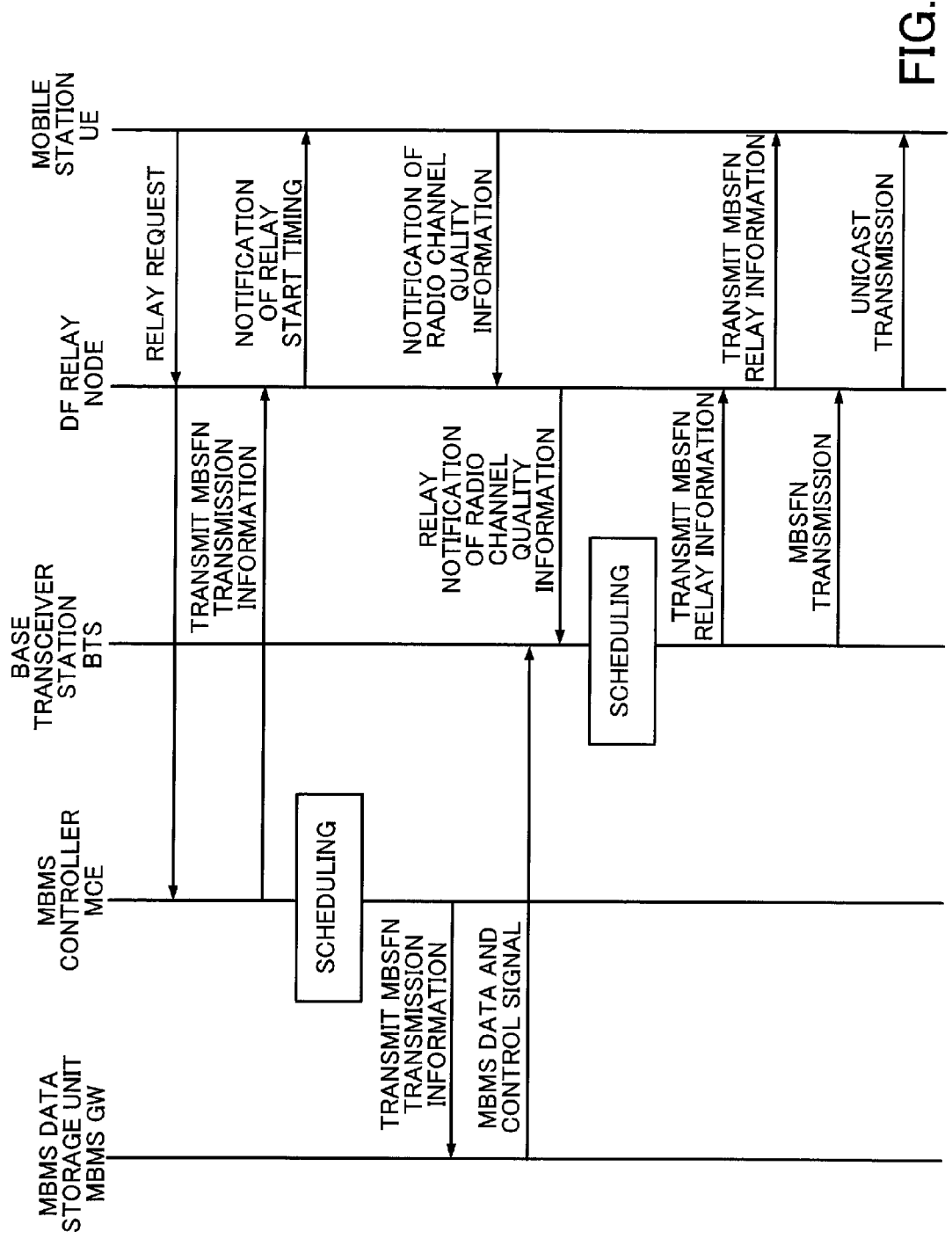
FIG. 16 is a sequence diagram of operation.

FIG. 16 is a sequence diagram of operation. FIG. 16 is an example of a process performed in the case of centralized scheduling. In three respects FIGS. 16 and 13 differ. Firstly, a mobile station transmits information (radio channel quality information) indicative of the quality of a radio channel between a DF relay node and the mobile station to a base transceiver station via the DF relay node. Secondly, the base transceiver station performs whole scheduling of communication by all mobile stations including a mobile station under the control of the DF relay node and a mobile station which communicates directly with the base transceiver station on the basis of the radio channel quality information, information indicative of the quality of a radio channel between the base transceiver station and the mobile station which communicates directly with the base transceiver station, and the like. The quality of the radio channel between the base transceiver station and the mobile station which communicates directly with the base transceiver station is measured by this mobile station. Thirdly, control information regarding a MBSFN transmission relay method determined as a result of the scheduling and MBMS data are transmitted to the mobile station via the DF relay node.

The following method is also discussed as a method for scheduling communication between the relay node RN and the mobile station 30-2. The base transceiver station 43a-1 performs whole scheduling of communication by the relay node RN in the cell of the base transceiver station 43a-1.

The base transceiver station 43a-1 performs in this way scheduling of transmission and receiving by one or more relay nodes RN which are in the cell of the base transceiver station 43a-1 and which perform relay. This method is referred to as centralized scheduling in the sense that a central base transceiver station performs scheduling.

In unicast transmission or single cell MBMS transmission information indicative of the quality of a radio channel between the relay node RN and the mobile station 30-2 transmitted from the mobile station 30-2 to the relay node RN is transmitted from the relay node RN to the base transceiver station 43a-1.

The base transceiver station 43a-1 collects radio channel quality information transmitted from DF relay nodes $RN_{DF}$ and the mobile station 30-1 with which the base transceiver station 43a-1 directly communicates in the scheduler 4 and perform scheduling. The base transceiver station 43a-1 then transmits scheduling information to each DF relay node $RN_{DF}$ by the use of a radio channel.

A DF relay node $RN_{DF}$ which receives the scheduling information generates a control signal on the basis of MBMS control information and generates a MCCH which is a logical channel. The DF relay node $RN_{DF}$ maps this MCCH to a MCH which is a transport channel, and radio-transmits the MCH by the use of a PMCH which is a radio channel. When the DF relay node $RN_{DF}$ receives MBMS data, changes its communication format to the unicast communication format or the single cell MBMS communication format, and transmits the MBMS data to the mobile station 30-2.

A fourth embodiment will now be described. In the above description MBSFN transmission is performed between the base transceiver station and the relay node. In the fourth embodiment, however, unicast transmission is performed between a base transceiver station and a relay node and MBSFN transmission is performed between the relay node and a mobile station.

Figure 17:
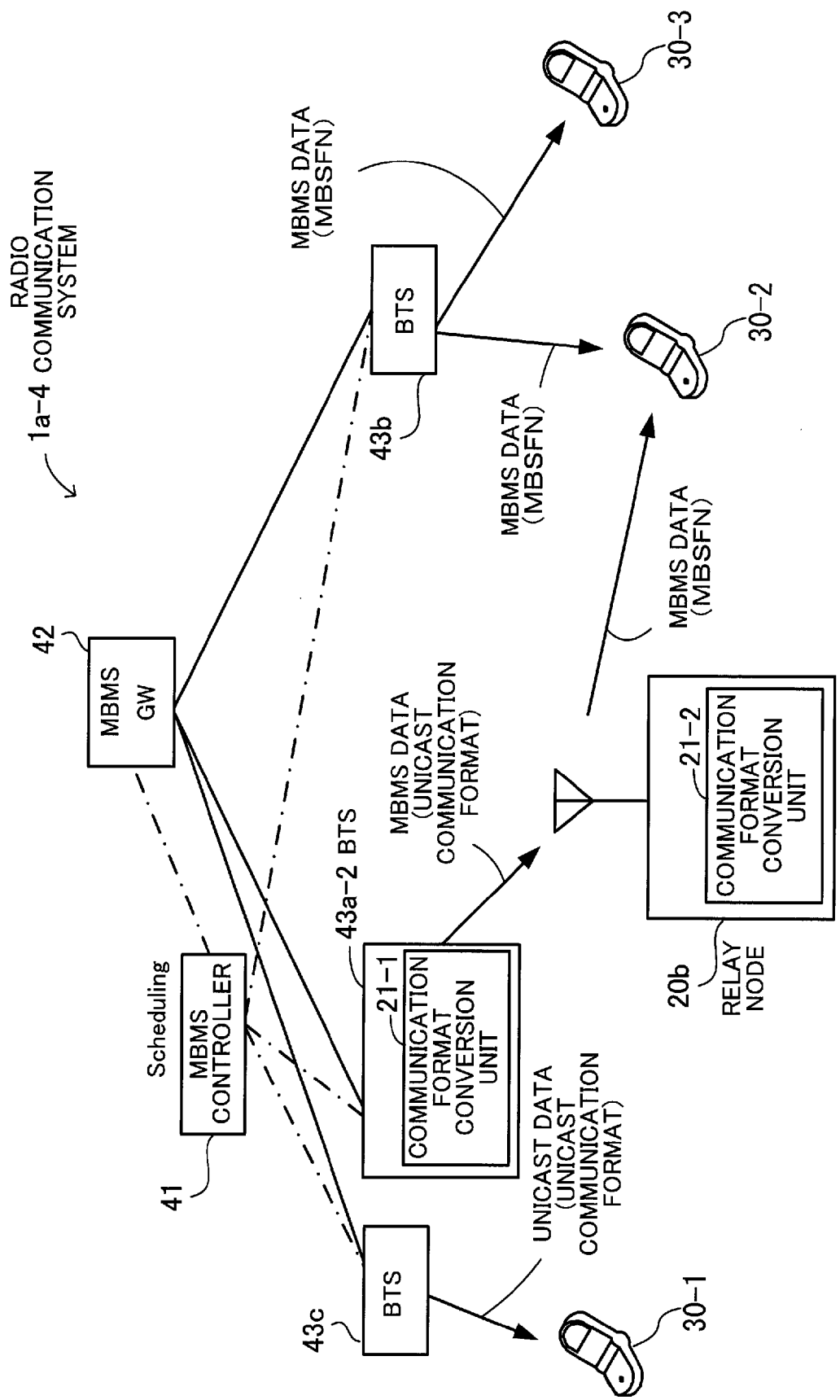
FIG. 17 illustrates the structure of a radio communication system.

FIG. 17 illustrates the structure of a radio communication system. A radio communication system 1a-4 includes a MBMS controller 41, a MBMS GW 42, base transceiver stations 43a-2, 43b, and 43c, a relay node 20b, and mobile stations 30-1 through 30-3.

The base transceiver station 43c transmits unicast data in the unicast communication format to the mobile station 30-1. The base transceiver station 43b transmits MBMS data in the MBSFN communication format to the mobile stations 30-2 and 30-3.

The base transceiver station 43a-2 includes a communication format conversion unit 21-1 and the relay node 20b includes a communication format conversion unit 21-2. The communication format conversion unit 21-1 included in the base transceiver station 43a-2 converts the MBSFN communication format to the unicast communication format and transmits MBMS data in the unicast communication format. The communication format conversion unit 21-2 included in the relay node 20b converts the unicast communication format to the MBSFN communication format and transmits the MBMS data in the MBSFN communication format.

Operation will be described. When a relay of MBSFN transmission is requested from the mobile station 30-2 to the relay node 20b, the relay node 20b gives the base transceiver station 43a-2 and the MBMS controller 41a notice of this request. The MBMS controller 41 which receives the notice gives the MBMS GW 42 instructions to transmit MBMS data to be transmitted to the mobile station 30-2 and the relay node 20b for relay to the base transceiver station 43a-2 (at least at a time corresponding to a delay caused by a relay process performed by the relay node 20b, for example) before normal MBSFN transmission timing.

The base transceiver station 43a-2 receives the MBMS data and the communication format conversion unit 21-1 included in the base transceiver station 43a-2 converts the format including an extended CP used for normal MBSFN transmission to the format including a normal CP. The base transceiver station 43a-2 transmits the MBMS data in the unicast communication format to the relay node 20b.

The relay node 20b receives the MBMS data in the unicast communication format and the communication format conversion unit 21-2 included in the relay node 20b converts the format using a normal CP to the format including an extended CP. The relay node 20b transmits the MBMS data in the MBSFN communication format to the mobile station 30-2.

As a result, it is possible to perform MBSFN transmission between the base transceiver station 43a-2 and the relay node 20b without interfering with communication between the base transceiver station 43b and the mobile station 30-2. In addition, the base transceiver station 43a-2 transmits the MBMS data before normal MBSFN transmission timing, so the mobile station 30-2 can receive and combine the MBMS data transmitted via the relay node 20b and the MBMS data transmitted from the base transceiver station 43b.

Figure 18:
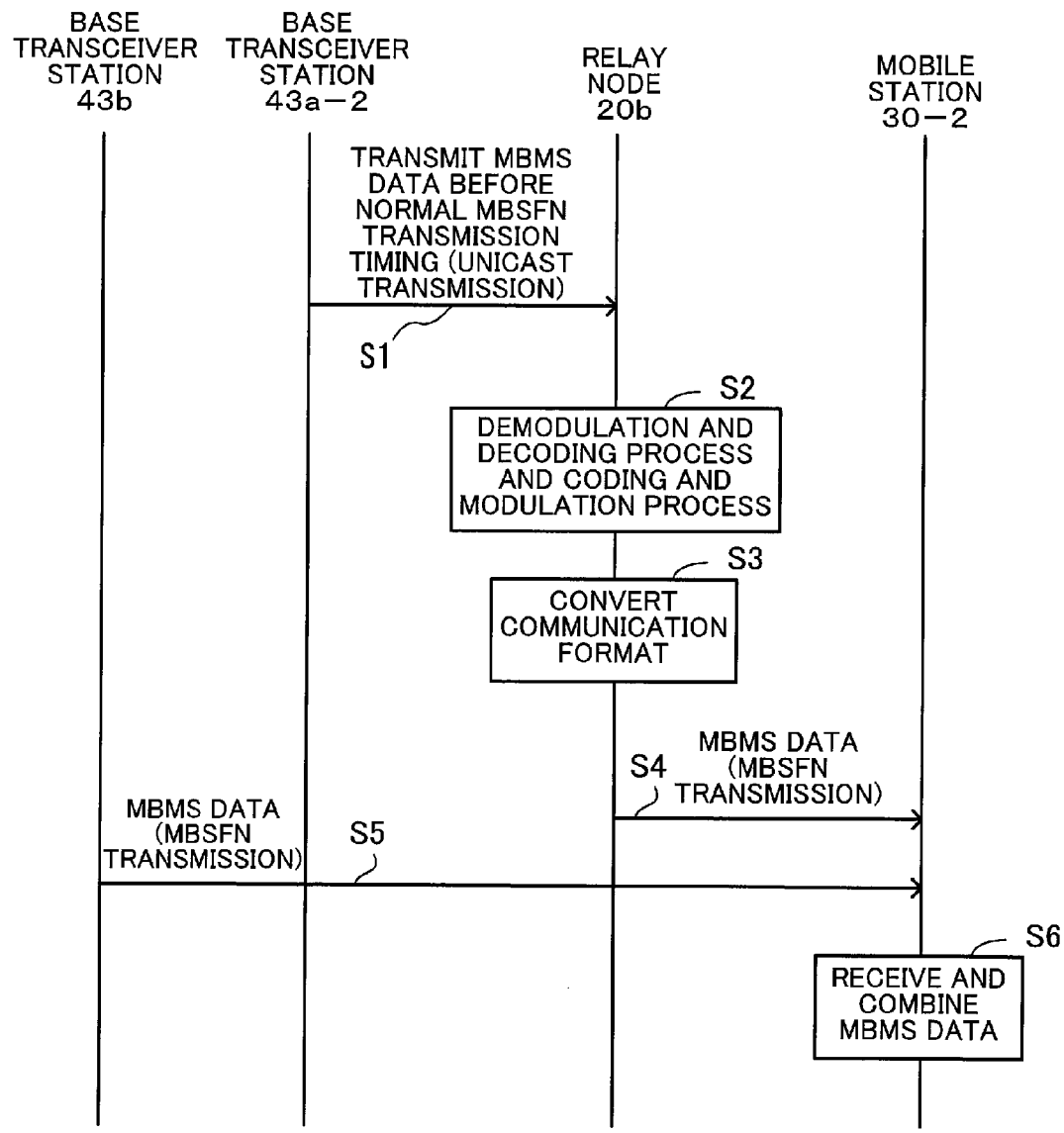
FIG. 18 is a sequence diagram of transmission of MBMS data before normal MBSFN transmission timing.

FIG. 18 is a sequence diagram of transmission of MBMS data before normal MBSFN transmission timing.

(S1) The base transceiver station 43a-2 transmits MBMS data in the unicast communication format to the relay node 20b, for example, at least at a time corresponding to a delay caused by a relay process performed by the relay node 20b (a time corresponding to a delay caused by a series of processes, that is to say, by a demodulation and decoding process and a coding and modulation process performed by the relay node 20b which is, for example, a DF relay node) before normal MBSFN transmission timing.

(S2) The relay node 20b performs the demodulation and decoding process and the coding and modulation process on the MBMS data.

(S3) The communication format conversion unit 21-2 included in the relay node 20b converts the unicast communication format to the MBSFN communication format and converts the format using a normal CP to the format using an extended CP.

(S4) The relay node 20b transmits the MBMS data in the MBSFN communication format to the mobile station 30-2.

(S5) The base transceiver station 43b transmits the MBMS data in the MBSFN communication format to the mobile station 30-2.

(S6) The mobile station 30-2 receives and synthesizes the MBMS data transmitted via the relay node 20b and the MBMS data transmitted from the base transceiver station 43b.

In the above sequence diagram the base transceiver station 43a-2 transmits MBMS data in the unicast communication format before normal MBSFN transmission timing and the relay node 20b converts the unicast communication format to the MBSFN communication format. However, when the base transceiver station 43a-2 transmits MBMS data in the MBSFN communication format before normal MBSFN transmission timing, the relay node 20b also converts the MBSFN communication format to the unicast communication format.

A modification of the above radio communication systems will now be described. In the above description the format using an extended CP is used for MBSFN transmission for the purpose of making it easy to receive MBSFN transmission from a remote base transceiver station and increasing the number of pieces of MBMS data which can be received and synthesized, that is to say, for the purpose of making it possible to receive MBMS data for which a propagation delay is long.

The fact that the use of an extended CP makes it possible to receive MBMS data for which a propagation delay is long shows that the radius of a cell can be increased. Accordingly, in the modification an extended CP is used for transmitting data which is not limited to MBMS data in a cell that is wider than a cell in which a normal CP is used.

If a relay node is installed in a cell with a long radius in the modification, then the relay node performs communication by the use of a normal CP because the radius of a cell of the relay node is short for its use.

Figure 19:
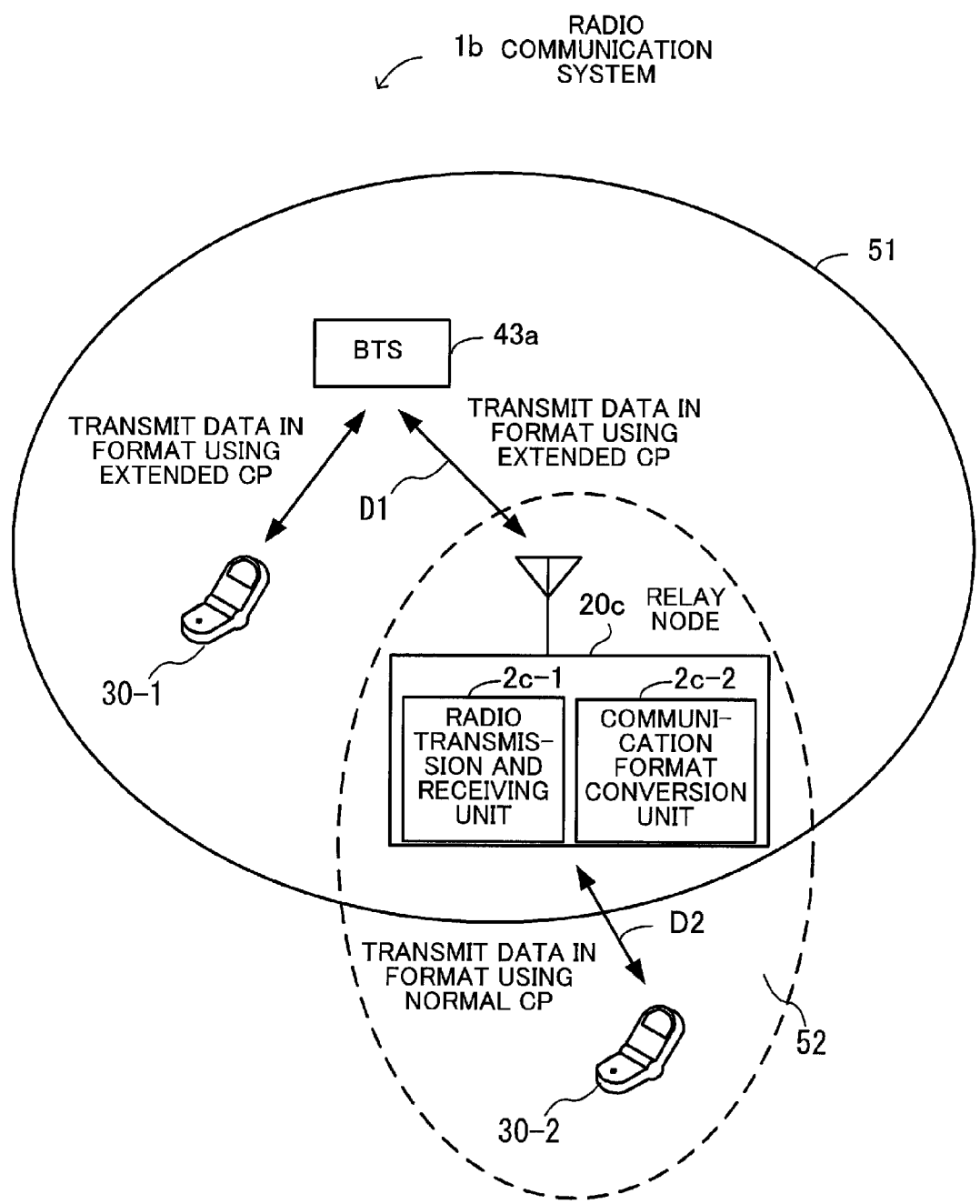
FIG. 19 illustrates the structure of a radio communication system.
Figure 20:
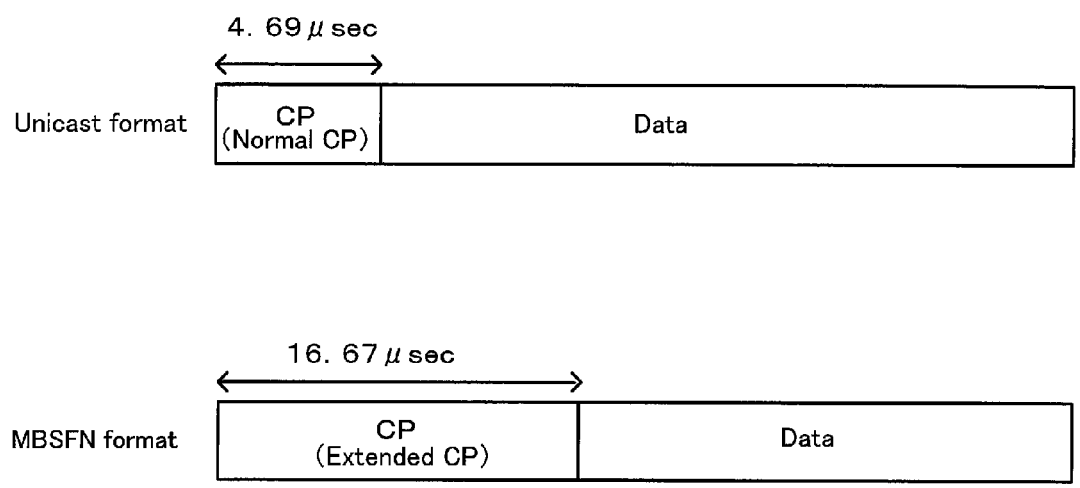
FIG. 20 illustrates the format of radio data.
Figure 21:
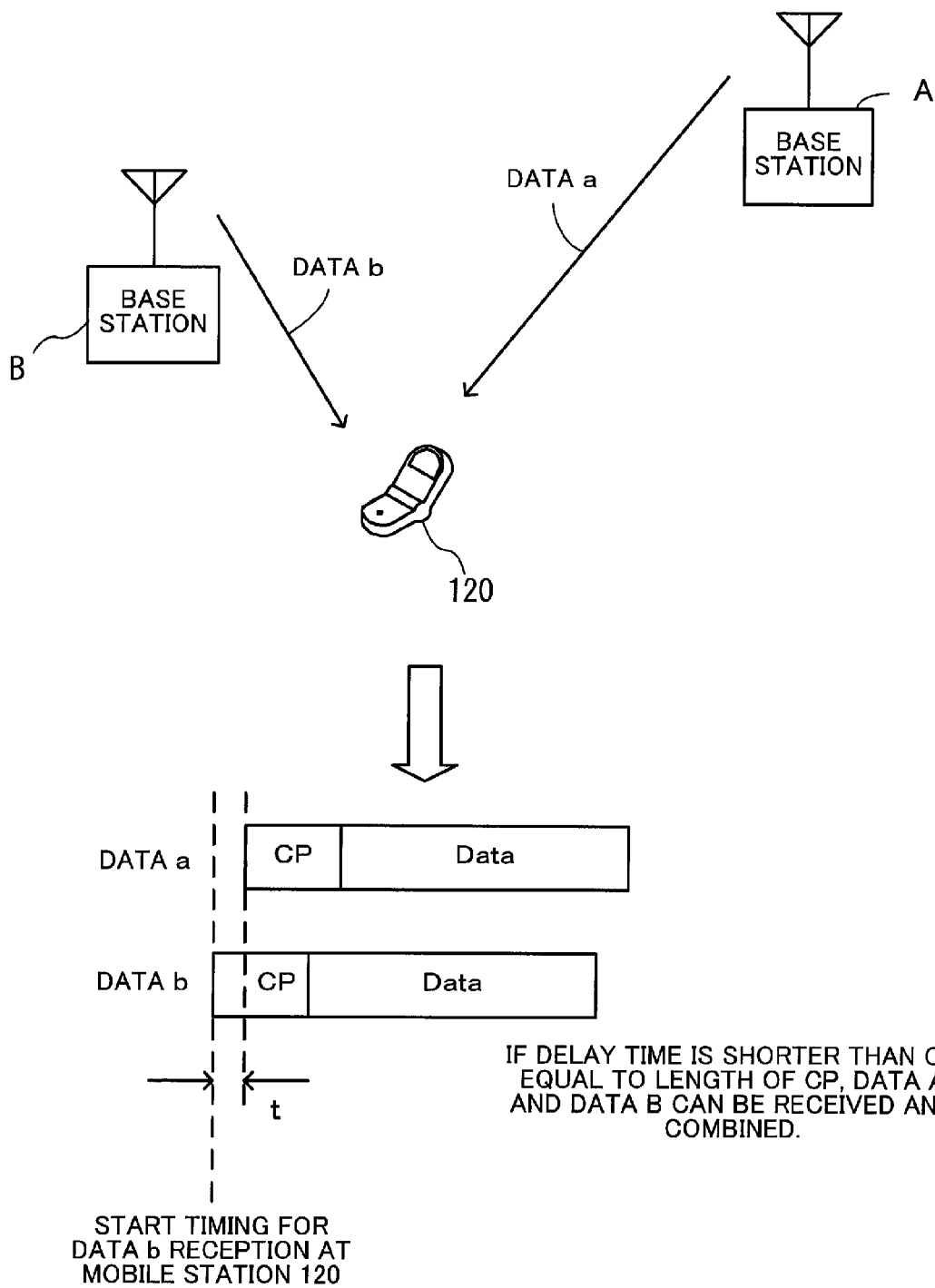
FIG. 21 illustrates data receiving and combining.
Figure 22:
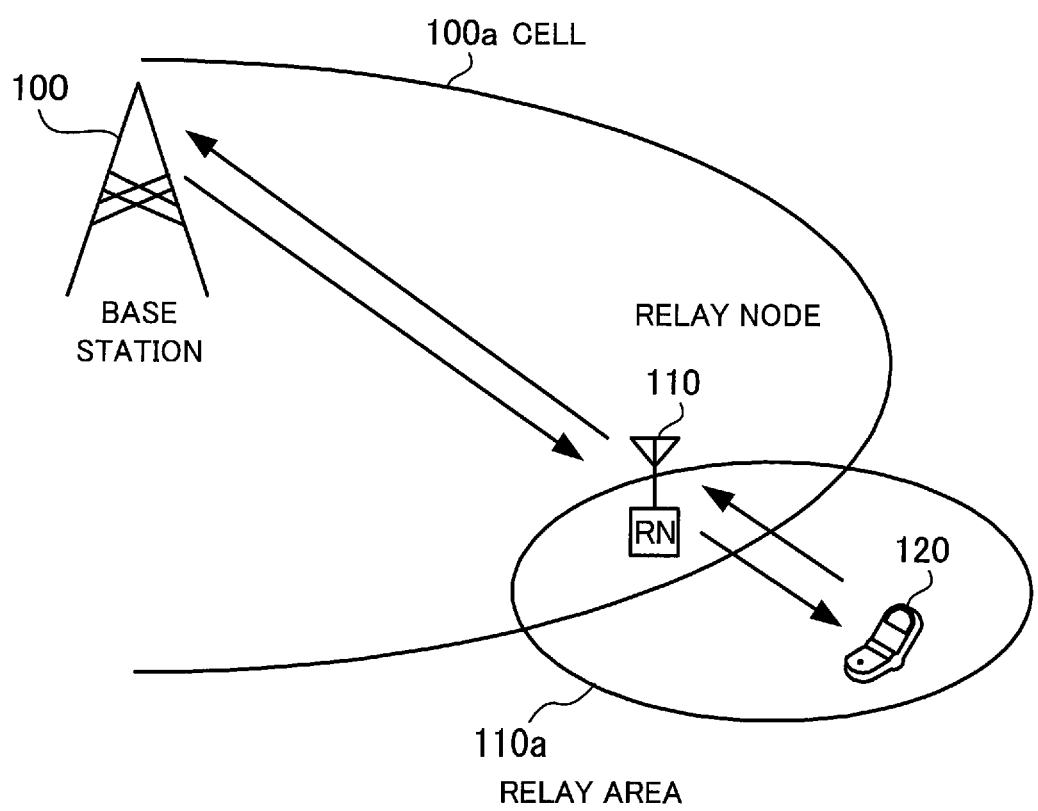
FIG. 22 illustrates cell extension.
Figure 23:
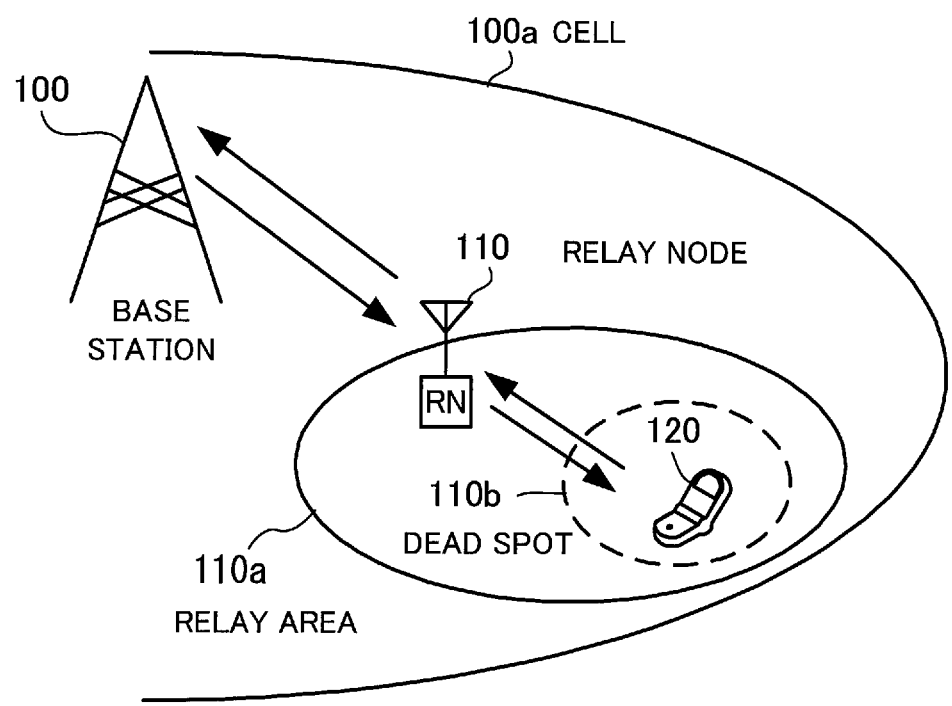
FIG. 23 illustrates countermeasures for a dead spot.
Figure 24:
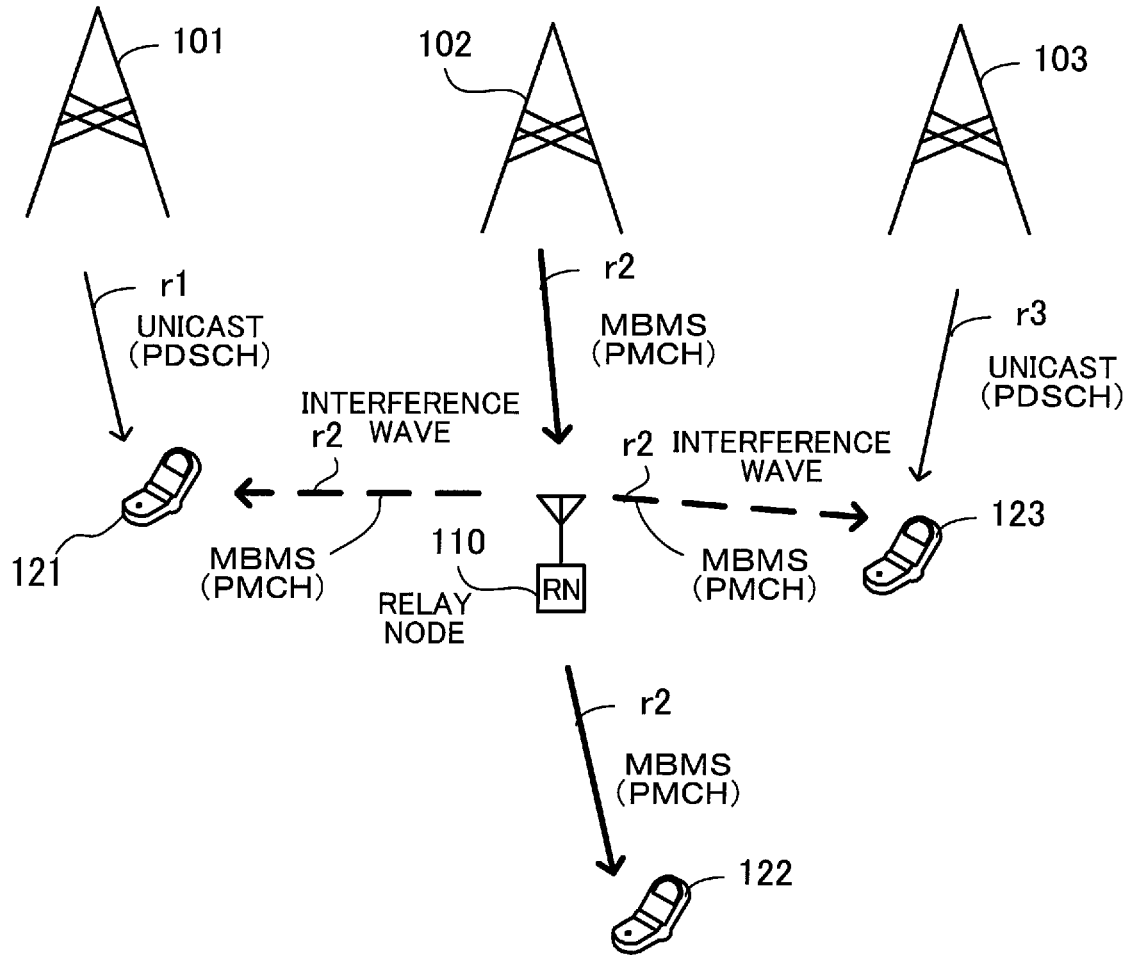
FIG. 24 illustrates the problem of being unable to distinguish between unicast data and MBMS data.
Figure 25:
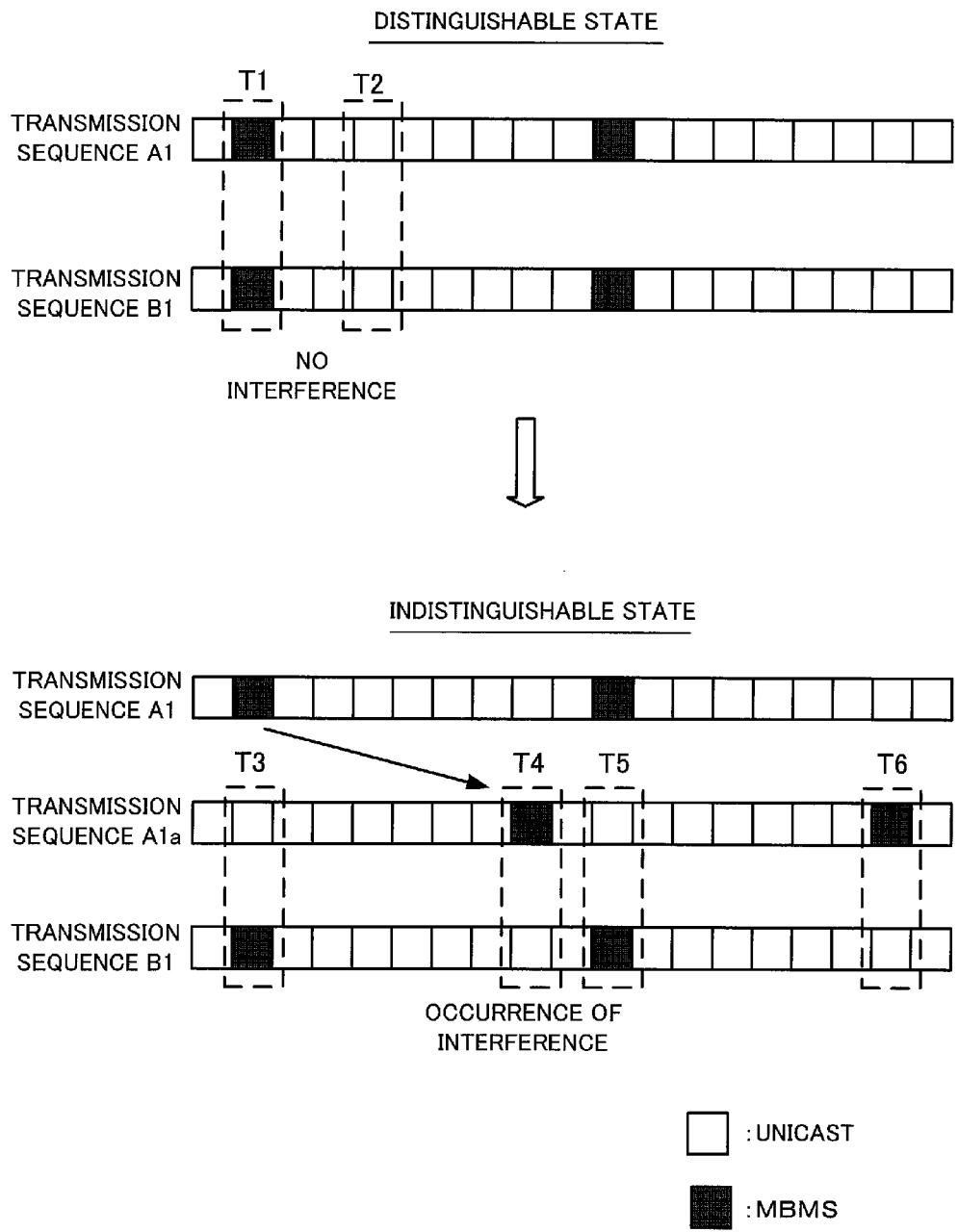
FIG. 25 illustrates the occurrence of interference caused by a timing deviation.

FIG. 19 illustrates the structure of a radio communication system. A radio communication system 1b includes a base transceiver station 43a, a relay node 20c, and mobile stations 30-1 and 30-2 (MBMS controller 41, a MBMS GW 42, and the like are not illustrated). The relay node 20c includes a radio transmission and receiving unit 2c-1 and a communication format conversion unit 2c-2.

A cell 51 is a cell of the base transceiver station 43a and a cell 52 is a relay area of the relay node 20c. The relay node 20c and the mobile station 30-1 are within the cell 51. The mobile station 30-2 is outside the cell 51 and is within the cell 52.

The radio transmission and receiving unit 2c-1 performs a radio transmission and receiving process with the base transceiver station 43a or the mobile station 30-2. When the communication format conversion unit 2c-2 communicates with the base transceiver station 43a, the communication format conversion unit 2c-2 performs communication by the use of a first radio data format using a first redundant portion (extended CP, for example). When the communication format conversion unit 2c-2 communicates with the mobile station 30-2, the communication format conversion unit 2c-2 performs communication by the use of a second radio data format using a second redundant portion (normal CP, for example) that is shorter than the first redundant portion.

In downlink transmission the base transceiver station 43a transmits data D1 in the format using an extended CP. When the relay node 20c receives the data D1, the communication format conversion unit 2c-2 transmits data D2 the format of which is converted to the format using a normal CP to the mobile station 30-2.

In uplink transmission the mobile station 30-2 transmits data D2 in the format using a normal CP to the relay node 20c. When the relay node 20c receives the data D2, the communication format conversion unit 2c-2 generates data D1 by converting the format to the format using an extended CP, and transmits the data D1 to the base transceiver station 43a.

As a result, the mobile station 30-1 within the cell receives data in the format using an extended CP, so the mobile station 30-1 receives and synthesizes plural pieces of data. Accordingly, receiving quality can be improved. In addition, the relay node 20c relays data in the format using a normal CP to the mobile station 30-2, so transmission can be performed with a coding rate decreased and the number of parity bits increased. Therefore, a transmission characteristic can be improved.

One example of a hardware configuration of a radio base station will be described. A radio base station includes a radio interface, processor, memory, logical circuit, and wired interface. The radio interface is an interface device that performs radio communications with a radio terminal or a relay node, and for example, includes an antenna. The processor is a device that processes data, and for example, includes a CPU (Central Processing Unit) and DSP (Digital Signal Processor). The memory is a device that stores data, and for example, includes a ROM (Read Only Memory) and RAM (Random Access Memory). The logical circuit is an electronic circuit that performs logical calculation, and for example, includes LSI (Large Scale Integration) and FPGA (Field-Programming Gate Array). The wired interface is an interface device that performs wired communications with another radio base station connected to a network of mobile telephone system side (so-called backhaul network).

One example of a hardware configuration of a relay node will be described. A relay node includes a radio interface, processor, memory, and logical circuit. The radio interface is an interface device that performs radio communications with a radio base station, radio terminal, or another relay node, and for example, includes an antenna. The processor is a device that processes data, and for example, includes a CPU (Central Processing Unit) and DSP (Digital Signal Processor). The memory is a device that stores data, and for example, includes a ROM (Read Only Memory) and RAM (Random Access Memory). The logical circuit is an electronic circuit that performs logical calculation, and for example, includes LSI (Large Scale Integration) and FPGA (Field-Programming Gate Array).

A correspondence between the relay node illustrated in FIGS. 9 and 10 and such hardware components is as follows. The radio interface corresponds to the antennas a1 and a2, for example. The processor, logical circuit, and memory correspond to the communication format conversion unit 21, receiving unit 22a-1, . . . , and transmission unit 28a-2, for example.

One example of a hardware configuration of a radio terminal will be described. A radio terminal includes a radio interface, processor, memory, logical circuit, input interface, and output interface. The radio interface is an interface device that performs radio communications with a radio base station or relay node, and for example, includes an antenna. The processor is a device that processes data, and for example, includes a CPU (Central Processing Unit) and DSP (Digital Signal Processor). The memory is a device that stores data, and for example, includes a ROM (Read Only Memory) and RAM (Random Access Memory). The logical circuit is an electronic circuit that performs logical calculation, and for example, includes LSI (Large Scale Integration) and FPGA (Field-Programming Gate Array). The input interface is a device for inputs, and for example, includes operational buttons and microphone. The output interface is a device for outputs, and for example, includes a display and speaker.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:
1. A radio communication system comprising:
a first radio station which performs communication with a mobile station by the use of a first radio signal;
a second radio station; and
a third radio station which communicates with both the first radio station and the second radio station, wherein:
the second radio station includes a processing unit, the processing unit
receives a second radio signal and converts the second radio signal to a third radio signal;
converts a first communication format type of the second radio signal to a second communication format type of the third radio signal; and
transmits the third radio signal to the third radio station;
wherein
the second radio signal is scrambled by a first scrambling code and the third radio signal is scrambled by a second scrambling code;
the first communication format type and the second communication format type include a cyclic prefix and a data; and
the first communication format type includes a first radio channel, and the second communication format type includes a second radio channel being different from the first radio channel.

2. A radio communication system comprising:
a first base station which communicates with a mobile station by the use of a first radio signal;
a second base station which transmits a second radio signal to a relay node;
the relay node which performs a relay process on the second radio signal; and
the mobile station which communicates with the first base station and the relay node,
wherein:
the relay node includes a processing unit,
the processing unit converts a first communication format type of the second radio signal to a second communication format type of a third radio signal;
and wherein:
the second radio signal scrambled by a first scrambling code and the third radio signal scrambled by a second scrambling code;
the first communication format type and the second communication format type include a cyclic prefix and a data;
the processing unit receives the second radio signal and transmits the third radio signal with the second communication format type to the mobile station; and
the first communication format type includes a first radio channel, and the second communication format type includes a second radio channel being different from the first radio channel.

3. The radio communication system according to claim 2, wherein when the processing unit converts the first communication format type of the second radio signal to the second communication format type of the third radio signal, the processing unit replaces a redundant portion added to the second radio signal with a redundant portion used in the first radio signal and generates the third radio signal.

4. The radio communication system according to claim 2, wherein:
the first radio signal is a unicast communication signal and the second radio signal is a broadcast signal; and
the processing unit converts a broadcast format type which is a communication format type of the broadcast signal to a unicast communication format type which is a communication format type of the unicast communication signal, and generates the broadcast signal in the unicast communication format type as the third radio signal.

5. The radio communication system according to claim 4, wherein the processing unit replaces, at the time of converting the broadcast format to the unicast communication format type, a first redundant portion added to the broadcast signal with a second redundant portion used in the unicast communication signal, and transmits the broadcast signal to which the second redundant portion is added as the third radio signal.

6. The radio communication system according to claim 2, wherein:
the first radio signal is a broadcast signal and the second radio signal is a unicast communication signal; and
the processing unit converts a unicast communication format type which is a communication format type of the unicast communication signal to a broadcast format type which is a communication format type of the broadcast signal, and generates the unicast communication signal in the broadcast format type as the third radio signal.

7. The radio communication system according to claim 6, wherein the processing unit replaces, at the time of converting the unicast communication format type to the broadcast format, a first redundant portion added to the unicast communication signal with a second redundant portion used in the broadcast signal, and transmits the unicast communication signal to which the second redundant portion is added as the third radio signal.

8. The radio communication system according to claim 2, wherein:
the first radio signal is unicast data and the second radio signal is MBMS (Multimedia Broadcast Multicast Service) data; and
the processing unit converts a MBSFN (Multimedia Broadcast multicast service Single Frequency Network) communication format type which is a communication format type of the MBMS data to a unicast communication format type which is a communication format type of the unicast data or a single cell MBMS communication format type, and generates the MBMS data in the unicast communication format type or the single cell MBMS communication format type as the third radio signal.

9. The radio communication system according to claim 8, wherein the processing unit replaces, at the time of converting the MBSFN communication format type to the unicast communication format type or the single cell MBMS communication format type, an extended CP which is a redundant portion added to data at MBSFN transmission time with a normal CP which is a redundant portion shorter than the extended CP, and transmits the MBMS data to which the normal CP is added as the third radio signal.

10. The radio communication system according to claim 2, wherein:
the first radio signal is MBMS (Multimedia Broadcast Multicast Service) data and the second radio signal is unicast data or single cell MBMS data; and
the processing unit converts a unicast communication format type which is a communication format type of the unicast data or a single cell MBMS communication format type which is a communication format type of the single cell MBMS data to a MBSFN communication format type which is a communication format type of the MBMS data, and generates the unicast data or the single cell MBMS data in the MBSFN (Multimedia Broadcast multicast service Single Frequency Network) communication format type as the third radio signal.

11. The radio communication system according to claim 10, wherein the processing unit replaces, at the time of converting the unicast communication format type or the single cell MBMS communication format type to the MBSFN communication format type, a normal CP which is a redundant portion added to data at unicast data or single cell MBMS data transmission time with an extended CP which is a redundant portion longer than the normal CP, and transmits the unicast data or the single cell MBMS data to which the extended CP is added as the third radio signal.

12. The radio communication system according to claim 2, wherein the second base station transmits the second radio signal to the relay node at a time corresponding to a delay caused by the relay process performed by the relay node.

13. A relay node comprising:
a processing unit configured to receive a first radio signal scrambled by a first scrambling code, and configured to convert a first communication format type of the first radio signal to a second communication format type of a second radio signal, the second radio signal scrambled by a second scrambling code;
wherein
the first communication format type and the second communication format type include a cyclic prefix and a data;
the processing unit communicates with a radio station based on the second communication format type of the second radio signal; and
the first communication format type includes a first radio channel, and the second communication format type includes a second radio channel being different from the first radio channel.

14. A mobile station comprising:
a processing unit configured to receive a second radio signal from a radio station by the use of a second communication format type,
wherein the radio station converts a first communication format type of a first radio signal to the second communication format type of the second radio signal, the first radio signal scrambled by a first scrambling code and the second radio signal scrambled by a second scrambling code;
the first communication format type and the second communication format type include a cyclic prefix and a data; and
the first communication format type includes a first radio channel, and the second communication format type includes a second radio channel being different from the first radio channel.

15. A radio communication method comprising:
performing, by a first base station, communication by the use of a first radio signal;
transmitting, by a second base station, a second radio signal;
performing, by a relay node including a processing unit, a relay process on the second radio signal;
communicating, by a mobile station with both the first base station and the relay node,
converting, by the processing unit, a first communication format type of the second radio signal to a second communication format type of a third radio signal; and
communicating, by the processing unit, with the mobile station based on the second communication format type of the third radio signal; the second radio signal scrambled by a first scrambling code and the third radio signal scrambled by a second scrambling code;
wherein
the first communication format type and the second communication format type include a cyclic prefix and a data; and
the first communication format type includes a first radio channel, and the second communication format type includes a second radio channel being different from the first radio channel.

* * * * *